(12) United States Patent
Ng et al.

(10) Patent No.: US 11,663,629 B1
(45) Date of Patent: *May 30, 2023

(54) MULTI-MERCHANT CONCOMITANT-USE POINT-OF-SALE DEVICE

(71) Applicant: Block, Inc., San Francisco, CA (US)

(72) Inventors: Claudia J. Ng, San Bruno, CA (US); Mark Funk, San Francisco, CA (US)

(73) Assignee: Block, Inc., Oakland, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/162,329

(22) Filed: Jan. 29, 2021

Related U.S. Application Data

(63) Continuation of application No. 15/596,151, filed on May 16, 2017, now Pat. No. 10,937,063.

(51) Int. Cl.
| | |
|---|---|
| G06Q 30/02 | (2023.01) |
| G06Q 30/0251 | (2023.01) |
| G06F 16/27 | (2019.01) |
| G06Q 20/20 | (2012.01) |
| G06Q 30/0601 | (2023.01) |
| G06Q 20/34 | (2012.01) |

(52) U.S. Cl.
CPC ......... *G06Q 30/0268* (2013.01); *G06F 16/27* (2019.01); *G06Q 20/204* (2013.01); *G06Q 20/209* (2013.01); *G06Q 20/356* (2013.01); *G06Q 30/0269* (2013.01); *G06Q 30/0631* (2013.01)

(58) Field of Classification Search
CPC .. G06Q 30/00–06; G06Q 10/00; G06Q 10/08; G06Q 20/00
USPC ...... 705/14.23, 14.49, 24, 26.7, 26.81, 27.1, 705/29, 33, 400
See application file for complete search history.

(56) References Cited

U.S. PATENT DOCUMENTS

| | | | |
|---|---|---|---|
| 7,197,475 B1 * | 3/2007 | Lorenzen | G06Q 30/02 705/26.81 |
| 7,324,962 B1 * | 1/2008 | Valliani | G06Q 30/0211 705/14.13 |
| 7,827,103 B1 | 11/2010 | Fu et al. | |

(Continued)

OTHER PUBLICATIONS

Advisory Action dated Sep. 7, 2021, for U.S. Appl. No. 16/177,135, of Grodin, S., filed Oct. 31, 2018.

(Continued)

*Primary Examiner* — Olusegun Goyea
(74) *Attorney, Agent, or Firm* — Lee & Hayes, P.C.

(57) ABSTRACT

This disclosure describes, in part, techniques for synchronizing data between merchants' inventories, and techniques for utilizing the data synchronization to process cross-merchant transactions. For instance, a system may store a first inventory of items indicating first items offered for purchase by a first merchant and a second inventory of items indicating second items offered for purchase by a second merchant. The system may then analyze the first inventory of items with respect to the second inventory of items to determine that the second merchant should offer a first item from the first items for purchase at a physical establishment of the second merchant on behalf of the first merchant. The system can then provide a merchant device of the second merchant with access to the second inventory of items and the first item from the first inventory of items.

20 Claims, 16 Drawing Sheets

(56) References Cited

U.S. PATENT DOCUMENTS

| | | | | |
|---|---|---|---|---|
| 9,195,959 | B1* | 11/2015 | Lopez | G06Q 30/0635 |
| 9,619,831 | B1 | 4/2017 | Kumar et al. | |
| 10,438,242 | B1 | 10/2019 | Carr et al. | |
| 10,937,063 | B1 | 3/2021 | Ng et al. | |
| 2003/0088491 | A1* | 5/2003 | Liu | G06Q 40/06 |
| | | | | 705/36 R |
| 2004/0049427 | A1* | 3/2004 | Tami | G06Q 30/02 |
| | | | | 705/24 |
| 2010/0235250 | A1* | 9/2010 | Bar-Levav | G06Q 30/06 |
| | | | | 705/16 |
| 2010/0262521 | A1* | 10/2010 | Robinson | G06Q 30/06 |
| | | | | 705/29 |
| 2011/0106668 | A1 | 5/2011 | Korosec et al. | |
| 2011/0191164 | A1* | 8/2011 | Reichert | G06Q 30/0246 |
| | | | | 705/14.43 |
| 2011/0288925 | A1 | 11/2011 | Thomas et al. | |
| 2012/0221393 | A1* | 8/2012 | Ouimet | G06Q 30/0633 |
| | | | | 705/14.23 |
| 2013/0151381 | A1* | 6/2013 | Klein | G06Q 10/087 |
| | | | | 705/27.1 |
| 2013/0159144 | A1* | 6/2013 | Higgins | G06Q 30/0601 |
| | | | | 705/26.81 |
| 2013/0166468 | A1* | 6/2013 | Vogelgesang | G06Q 10/087 |
| | | | | 705/330 |
| 2013/0185150 | A1 | 7/2013 | Crum | |
| 2013/0304578 | A1 | 11/2013 | Kannan et al. | |
| 2014/0067596 | A1* | 3/2014 | McGovern | G06Q 30/0246 |
| | | | | 705/26.7 |
| 2014/0156392 | A1* | 6/2014 | Ouimet | G06Q 30/0633 |
| | | | | 705/26.7 |
| 2014/0297437 | A1 | 10/2014 | Natarajan | |
| 2017/0228808 | A1* | 8/2017 | Kumar | G06Q 20/20 |
| 2017/0286899 | A1* | 10/2017 | Deshpande | G06Q 10/087 |
| 2017/0293881 | A1* | 10/2017 | Narkulla | G06Q 10/083 |
| 2017/0330266 | A1* | 11/2017 | Deshpande | G06Q 30/0635 |

OTHER PUBLICATIONS

Final Office Action dated Aug. 4, 2022, for U.S. Appl. No. 16/177,135, of Grodin, S., filed Oct. 31, 2018.
Non-Final Office Action dated Oct. 23, 2015, for U.S. Appl. No. 14/056,832, of Labanca, J.J., filed Oct. 17, 2013.
Final Office Action dated Feb. 25, 2016, for U.S. Appl. No. 14/056,832, of Labanca, J.J., filed Oct. 17, 2013.
Advisory Action dated May 17, 2016, for U.S. Appl. No. 14/056,832, of Labanca, J.J., filed Oct. 17, 2013.
Non-Final Office Action dated Jun. 21, 2016, for U.S. Appl. No. 14/056,832, of Labanca, J.J., filed Oct. 17, 2013.
Non-Final Office Action dated Oct. 25, 2016, for U.S. Appl. No. 14/056,832, of Labanca, J.J., filed Oct. 17, 2013.
Final Office Action dated Feb. 23, 2017, for U.S. Appl. No. 14/056,832, of Labanca, J.J., filed Oct. 17, 2013.
Advisory Action dated May 3, 2017, for U.S. Appl. No. 14/056,832, of Labanca, J.J., filed Oct. 17, 2013.
Non-Final Office Action dated Jul. 15, 2019, for U.S. Appl. No. 15/601,714, of LaBanca, J.J., filed May 22, 2017.
Final Office Action dated Oct. 30, 2019, for U.S. Appl. No. 15/601,714, of LaBanca, J.J., filed May 22, 2017.
Non-Final Office Action dated Dec. 12, 2019, for U.S. Appl. No. 15/596,151, of Ng, C.J., et al., filed May 16, 2017.
Advisory Action dated Jan. 10, 2020, for U.S. Appl. No. 15/601,714, of LaBanca, J.J., filed May 22, 2017.
Non-Final Office Action dated Apr. 7, 2020, for U.S. Appl. No. 15/601,714, of LaBanca, J.J., filed May 22, 2017.
Notice of Allowance dated Oct. 19, 2020, for U.S. Appl. No. 15/596,151, of Ng, C.J., et al., filed May 16, 2017.
Non-Final Office Action dated Dec. 16, 2020, for U.S. Appl. No. 16/177,135, of Grodin, S., filed Oct. 31, 2018.
Final Office Action dated Jun. 9, 2021, for U.S. Appl. No. 16/177,135, of Grodin, S., filed Oct. 31, 2018.
Non-Final Office Action dated Jan. 21, 2022, for U.S. Appl. No. 16/177,135, of Grodin, S., filed Oct. 31, 2018.

* cited by examiner

MULTI-MERCHANT CONCOMITANT-USE POINT-OF-SALE DEVICE

CROSS REFERENCE TO RELATED APPLICATIONS

This Patent Applications is a continuation of and claims the benefit of priority to U.S. patent application Ser. No. 15/596,151, filed May 16, 2017, entitled "SYNCHRONIZING DATA BETWEEN DATA STRUCTURES FOR CROSS-MERCHANT TRANSACTIONS," the entire contents of which are incorporated herein by reference.

BACKGROUND

Merchants may conduct transactions for items and services with customers. During a transaction between a merchant and a customer, the merchant can use a point-of-sale (POS) device to input information associated with the transaction. For example, the merchant can include information describing items that the customer is acquiring from the merchant, respective prices of each of the items, and an identifier of a payment instrument being used by the customer. The POS device can then send a request to a payment service to process the payment instrument for a price of the transaction.

In some instances, multiple merchants may share a common physical establishment in which both merchants provide items for acquisition to customers. For instance, a first merchant in the physical establishment may conduct transactions with customers for first items that are associated with, and provided by, the first merchant. Additionally, a second merchant in the physical establishment may conduct transactions with customers for second items that are associated with, and provided by, the second merchant. If the two merchants share common computing resources, such as a POS device, this can cause problems for both the POS device and the payment service. For instance, if a customer acquires items that are provided by both merchants, then the merchant device and the payment service are required to process two separate transactions, where a first transaction is for the items provided by the first merchant and a second transaction is for the items provided by the second merchant.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
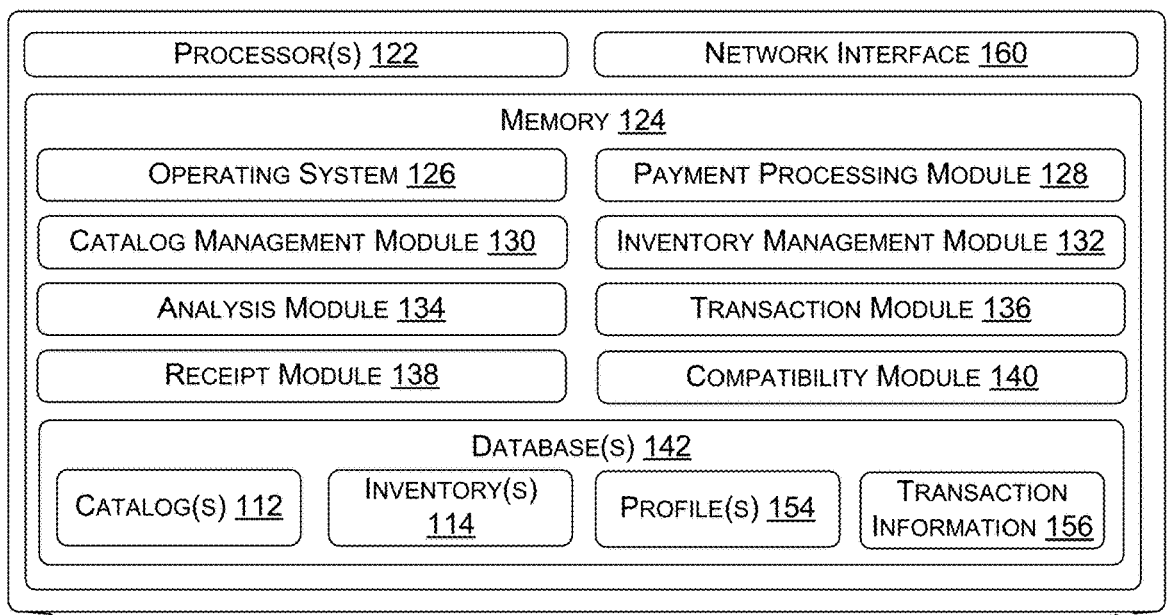
FIG. 1 illustrates an example environment in which techniques discussed herein may be implemented.
Figure 1:
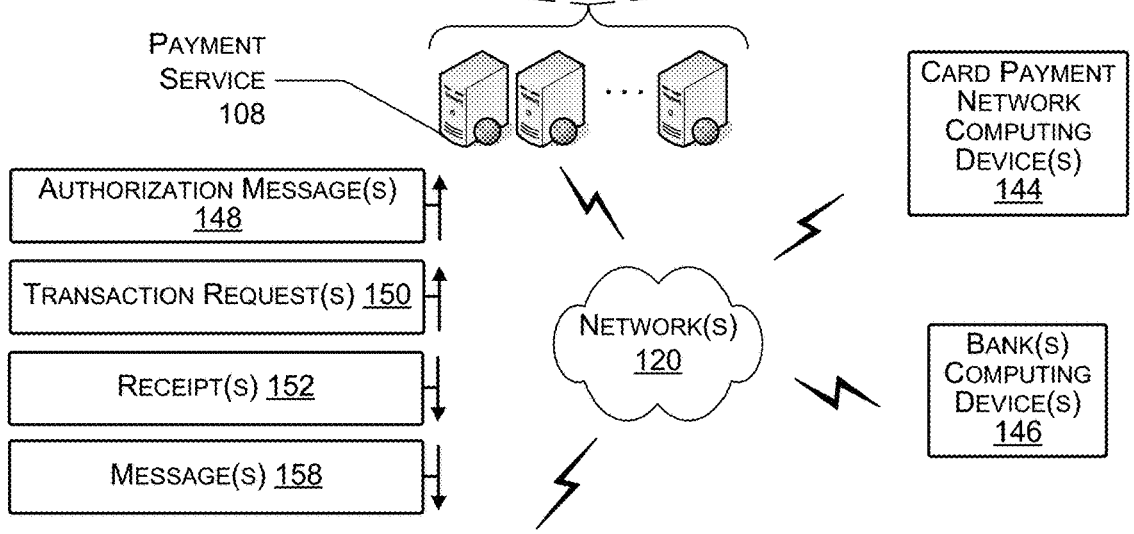
Figure 1:
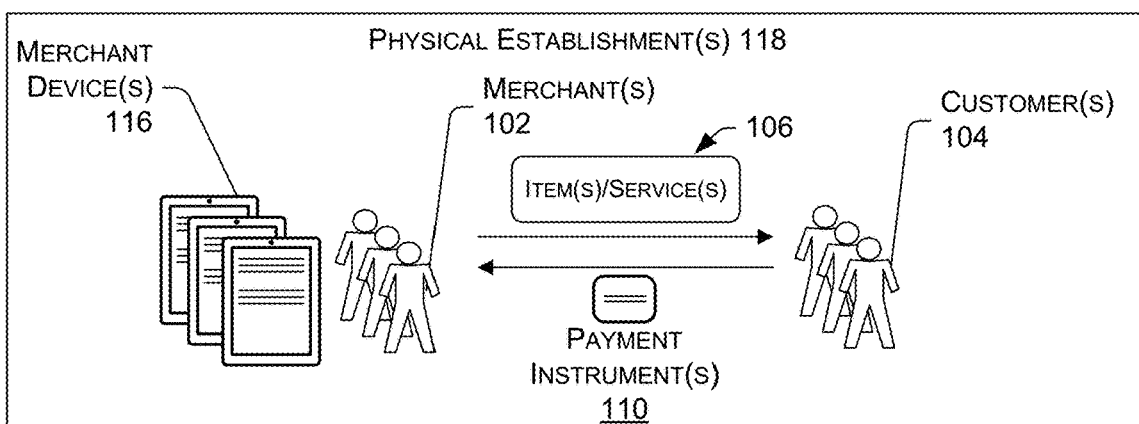

This disclosure describes, in part, techniques for synchronizing data between merchants' inventories, and techniques for utilizing the data synchronization to process cross-merchant transactions. In some instances, a payment service may offer a variety of services to help merchants (also referred to as "entity" for a single merchant or "entities" for more than one merchant) streamline their businesses. For instance, the payment service may provide tools to enable merchants to manage aspects of their businesses. As an example, the payment service may provide tools for maintaining a catalog (i.e., catalog data structures) and/or an inventory (i.e., inventory data structures). A tool for maintaining a catalog may enable a merchant to access and manage a database storing data associated with items (and/or data associated with services) that the merchant has available for acquisition (i.e., a catalog). In at least one example, as described below, the catalog may include a plurality of data items and a data item of the plurality of data items may represent an item that the merchant has available for acquisition.

The data item may identify (e.g., provide an indication of) the item and may be associated with additional data that represents information about the item. For instance, the additional data may include attribute(s) of the item, a price of the item, a discount available for the item, taxes applicable to the item, a location of the item (e.g., where the item is located in a warehouse), image(s) of the item, etc. In at least one example, attribute(s) may correspond to variants of the item and may be represented by attribute values. A creator of a catalog may specify attribute names and allowed values for each of the attributes, dependent on the actual characteristics of an item. For instance, attribute names may include "color" and "size" and attribute values may include "red" or "green" or "small," "medium," or "large," for each attribute name, respectively.

The payment service may provide various access points to a merchant so that the merchant can access and manage the merchant's catalog. As a non-limiting example, the payment service may enable a merchant to access and manage its catalog via a web interface, a user interface presented via a point-of-sale (POS) device associated with the merchant, etc. In at least one example, the catalog may be shared with potential customers and/or may be utilized for creating purchase orders for the items. Additionally, or alternatively, descriptive information about the items may be imported for inclusion in catalogs associated with other merchants.

Although the above describes that a catalog may enable a merchant to access and manage a database storing data associated with items, in some instances, the catalog may further enable the merchant to access and manage a database (and/or the same database) storing data associated with services. For instance, the catalog may include a plurality of data services and a data service of the plurality of data services may represent a service that the merchant has available for acquisition. In some instances, the data service may identify the service and may be associated with additional data that represents information about the service. For instance, the additional data may include information describing how the service is performed, a price of the service, etc.

Additionally, or alternatively, the payment service may provide a merchant with a tool for managing its inventory. That is, the payment service may provide inventory tracking and reporting via such a tool. A tool for managing inventory may enable a merchant to access and manage a database storing data associated with a quantity of each item that the merchant has available (i.e., an inventory). The merchant may update the inventory following an inventory activity (i.e., where entities associated with the merchant manually determine quantities of each of the items that the merchant has available), upon receiving new item(s) that are to be offered for acquisition, after item(s) are acquired by customers, etc. The payment service may then update the inventory based on information received from the merchant (e.g., the POS device) and/or other sources and/or systems. For instance, in some examples, the payment service may track individual instances of an item as the instance moves through merchant(s) associated with a product supply chain.

In at least one example, the inventory may include additional information associated with items in the inventory. For instance, data associated with such additional information may include current ownership (i.e., which merchant in the product supply chain has the item), location, sale-related events, etc. In some examples, the catalog may cross-reference the inventory. That is, in some examples, the additional data associated with an item may include a quantity associated with the item as indicated in the inventory and/or additional information that is available via the inventory.

The payment service may provide various access points to a merchant so that the merchant can access and manage its inventory. As a non-limiting example, the payment service may enable a merchant to access and manage its inventory via a web interface, a user interface presented via the POS device, etc. In at least one example, the inventory may be useful for generating inventory reports regarding items in the inventory of a merchant.

In some instances, the payment service can synchronize data between merchant inventories for two or more merchants, and then use the data synchronization to process cross-merchant transactions. As described herein, a cross-merchant transaction can include a transaction for at least one item (and/or similarly service) provided by, and owned by, a first merchant and at least one item (and/or similar service) provided by, and owned by, a second merchant. For instance, a second merchant may conduct a transaction with a customer in which the customer acquires a first item that is provided by the first merchant, as indicated by a first inventory associated with the first merchant, and second item that is provided by a second merchant, as indicated by a second inventory associated with the second merchant. In some instances, the first merchant and the second merchant may share common computing resources. For instance, the first merchant and the second merchant may utilize a common merchant device to conduct transactions with customers. In some instances, the first merchant and the second merchant may each utilize separate computing resources. For instance, the first merchant may utilize a first merchant device to conduct transactions with customers and the second merchant may utilize a second merchant device to conduct transactions with customers.

To synchronize the data, the payment service may initially provide one or more recommendations that the first merchant and the second merchant perform cross-merchant transactions by offering each other's items for acquisition. For instance, the payment service can generate and store at least a first profile associated with the first merchant and a second profile associated with the second merchant. The first profile can include attributes associated with the first merchant, such as a type of business associated with the first merchant, a geographical location associated with the first merchant, and business hours associated with the first merchant. The second profile can include attributes associated with the second merchant, such as a type of business associated with the second merchant, a geographical location associated with the second merchant, and business hours associated with the second merchant. The payment service can then analyze at least the first merchant profile with respect to the second merchant profile (and, in some instances, additional merchant profiles) to identify at least one similarity between the first merchant profile and the second merchant profile.

Based on identifying the at least one similarity, the payment service can analyze the first inventory with respect to the second inventory. For instance, the payment service can compare first items indicated by the first inventory with respect to second items indicated by the second inventory. During the comparison, the payment service can identify a first item and/or subset of the first items that the second merchant should provide for acquisition. For instance, the payment service can identify a first item and/or subset of the first items that the second merchant does not already provide for acquisition. In some instances, when identifying items, the payment service can take business hours of the merchants into consideration. For instance, the payment service can determine that the first merchant includes different business hours than the second merchant and as such, the second merchant can provide the first item and/or the subset of the first items during business hours in which the first merchant is closed.

In some instances, the payment service may further utilize transaction information when analyzing the inventories. For instance, the payment service may analyze transaction information associated with transactions conducted by merchants, the first inventory, and the second inventory. Based on the analysis, the payment service can determine that, during at least one of the transactions, a customer acquired a first item provided by the first merchant and a second item provided by the second merchant from a respective merchant (e.g., a third merchant). The payment service can then generate one or more messages that are based on the determination.

For example, the payment service can generate a message that recommends that the second merchant provide the first item for acquisition at the physical establishment, since customers may acquire the first item with the second item that is already provided by the second merchant, and send the message to a merchant device associated with the second merchant. In some instances, in addition to recommending the first item, the payment service may further generate the message to indicate that the first merchant already offers the first item for acquisition. For another example, the payment service can generate a message that recommends that the first merchant authorize the second merchant to provide the first item for acquisition at the physical establishment. The payment service can then send the message to a merchant device associated with the first merchant.

After sending the recommendation, the payment service may receive, from a merchant device, a message authorizing the second merchant to offer for acquisition the first item from the first inventory. In some instances, the first merchant authorizes the second merchant to offer the first item for acquisition at a physical establishment of the second merchant. In some instances, the payment service receives the message via one of the various access points provided by the payment service to the first merchant to manage the first inventory. Based on receiving the message, the payment service can synchronize data between the first inventory and the second inventory.

In some instances, the payment service synchronizes the data by providing the second merchant access to the second inventory as well as any of the first items from the first inventory (e.g., the first item in the example above) that the second merchant is authorized to provide. For instance, the payment service can determine that the second merchant is utilizing a merchant device during business hours to conduct transactions with customers. Based on the determination, the payment service can provide the merchant device with access to the second inventory and as well as any of the first items that the second merchant is authorized to provide for the first merchant. The second merchant can then use the access to conduct transactions with customers that include the second items and any of the first items that the second merchant is authorized to provide.

In some instances, synchronizing the data can include storing data indicated any of the first items that the second merchant is authorized to provide association with the second inventory. For instance, the payment service can store data indicating the first item in association with the second inventory. In some instances, the message may further authorize the second merchant to offer a specific quantity of the first item. In such instances, the payment service can further update the second inventory to indicate the quantity of the first item. Additionally, since the first item is the first merchant's inventory, the payment service can store, in association with the second inventory, data that indicates that the first item is the first merchant's item (e.g., owned by the first merchant).

After updating the second inventory, the payment service may receive, from the merchant device associated with the second merchant, a request to process a transaction between the second merchant and a customer, where the transaction is for at least the first item and a second item that is provided by, and owned by, the second merchant. In response, the payment service can attempt to authorize a payment instrument of the customer for a price of the transaction. The payment service can further generate a receipt for the transaction, where the receipt indicates at least that the second merchant conducted the transaction, the first item, a price of the first item, the second item, a price of the second item, and/or a total price of the transaction. In some instances, the receipt further indicates that the first item is associated with, and/or provided for acquisition by, the first merchant. The payment service can then send data representing the receipt to the merchant device.

In some instances, the payment service can automatically split funds received from the transaction between respective accounts associated with the first merchant and the second merchant. For instance, the payment service can determine, based on the first inventory and/or the second inventory, that the first item is associated with the first merchant (e.g., owned by the first merchant). In response, the payment service can cause a first portion of the funds to be transferred to an account associated with the first merchant, where the first portion is based on the price of the first item. The payment service can further cause a second portion of the funds to be transferred to an account associated with the second merchant, where the second portion is based on the price of the second item. In some instances, if the first merchant has authorized a sales commission on items provided by the second merchant, the splitting of the funds can further be based on the authorized sales commission.

Based on processing the transaction, the payment service can then update each of the first inventory and the second inventory. For instance, since the first merchant now has one less first item in inventory, the payment service can update the first inventory to indicate the change in quantity of the first item. For instance, the payment service can reduce the quantity for the first item by one unit. Additionally, the payment service can update the second inventory to indicate the change in both the quantity of the first item and a quantity of the second item. For instance, the payment service can reduce each of the quantity of the first item and the quantity of the second item by one unit.

By performing the techniques described above, the payment service may only be required to process a single transaction even through the transaction includes items associated with, and owned by, two separate merchants. For instance, by synchronizing the data between the inventories of the two merchants, using stored data, the payment service can determine which respective merchant each item from the transaction is associated with based on analyzing the inventories. Additionally, based on the determination, the payment service can automatically cause portions of funds received from the transaction to be transferred into respective accounts of the merchants. Therefore, in some instances, the payment service is not required to process a first transaction for items associated with, and owned by, the first merchant, and a second transaction for items associated with, and owned by, the second merchant.

Additionally, by performing the techniques described above, two or more merchants can share common computing resources (e.g., a common merchant device) when performing transactions with customers. The payment service system can intelligently determine compatible merchants and relevant items for each and enable a computing system associated with one merchant to process transactions for another merchant. Such a system enhances the functionality for an individual merchant device through a matching algorithm and populating additional items on a user interface of the merchant device for facilitating transactions with customers.

For instance, the first merchant can authorize the second merchant to provide, for acquisition, one or more of the first item associated with the first merchant and/or the second merchant can authorize the first merchant to provide, for acquisition, one or more of the second items associated with the second merchant. Based on the authorization(s), the payment service can synchronize the data between the first inventory and the second inventory. Additionally, the first merchant and/or the second merchant can conduct transactions with customer, which can acquire one or more of the first items and one or more of the second items, using a common merchant device since the payment service performs the processes of associating respective items with each merchant and transferring portions of the funds to respective merchant accounts.

It should be noted that, while the above techniques and examples discuss synchronizing data and processing cross-merchant transactions for items, similar techniques may be used for services. For instance, a first merchant may authorize a second merchant to provide a service for acquisition to customers. Based on the authorization, the payment service may update the catalogs and/or inventories of the merchants. Additionally, the payment service may process a cross-merchant transaction where a customer is acquiring the service from the second merchant.

FIG. 1 illustrates an example environment 100 that includes merchant(s) 102 conducting transactions with customer(s) 104 for item(s)/service(s) 106, as well as a payment service 108 to authorize payment instrument(s) 110 of the customer(s) 104 for the transactions. FIG. 1 further illustrates the payment service 108 synchronizing data between catalog(s) 112 and/or inventory(s) 114 associated with the merchant(s) 102. Moreover, FIG. 1 illustrates the payment service 108 utilizing the synchronized data to process cross-merchant transactions.

As used in herein, merchant device(s) 116 may comprise any sort of mobile or non-mobile devices (e.g., electronic device(s)) that include instances of application(s) that execute on the respective merchant device(s) 116. The application(s) may provide POS functionality to the merchant device(s) 116 to enable merchant(s) 102 (e.g., owners, employees, etc.) to at least accept payments from the customer(s) 104. In some types of businesses, the merchant device(s) 116 may correspond to a store or other place of business of the merchants, and thus, may be a fixed location that typically does not change on a day-to-day basis. In other types of businesses, however, the location of the merchant device(s) 116 may change from time to time, such as in the case that the merchant(s) 102 operate a food truck, is a street vendor, is a cab driver, etc., or has an otherwise mobile business, e.g., in the case the merchant(s) 102 sell items at buyer's homes, places of business, and so forth. In either of the examples above, the place of business of the merchant(s) 102 may be referred to a physical establishment(s) 118.

Additionally, as used herein, a merchant 102 (also referred to as an "entity") may include any business engaged in the offering of items (e.g., goods) or services for acquisition by customer(s) 104. Actions attributed to a merchant 102 may include actions performed by owners, employees, or other agents of the merchant 102, and thus no distinction is made herein unless specifically discussed. In addition, as used herein, a customer 104 may include any entity that acquires items or services from a merchant 102, such as by purchasing, renting, leasing, borrowing, licensing, or the like. Hereinafter, items and/or services offered by merchants 102 may be referred to solely as items. Thus, a merchant 102 and a customer 104 may interact with each other to conduct a transaction in which the customer 104 acquires an item from a merchant 102, and in return, the customer 104 provides payment to the merchant 102.

As used herein, a transaction may include a financial transaction for the acquisition of items and/or services that is conducted between customer(s) 104 and merchant(s) 102. For example, when paying for a transaction, the customer 104 can provide the amount that is due to the merchant 102 using cash or other payment instrument 110 (e.g., a debit card, a credit card, a stored-value or gift card, a check, through an electronic payment application on a device carried by the customer 104, or the like). The merchant 102 can interact with the merchant device(s) 116 to process the transaction, such as by inputting (e.g., manually, using a magnetic card reader or an RFID reader, etc.) identifiers (e.g., payment information, such as a card number, account number, or any other account information) associated with the payment instrument 110. For example, a payment instrument 110 of the customer 104 may include one or more magnetic strips for providing card and customer information when swiped in a card reader. In other examples, the payment instrument 110 may include other types of payment cards may be used, such as smart cards having a built-in memory chip that is read by the device when the card is "dipped" into the reader, a radiofrequency identification tag, or so forth.

During a transaction between a merchant 102 and a customer 104, the merchant device(s) 116 can determine transaction information describing the transaction, such as the payment information of the payment instrument 110, an amount of payment received from the customer 104, the item(s)/service(s) 106 acquired by the customer 104, a time, place and date of the transaction, a card network associated with the payment instrument 110, an issuing bank of the payment instrument 110, a name of the customer 104, and so forth. The merchant device(s) 116 can send the transaction information to the payment service 108 over a network 120, either substantially contemporaneously with the conducting of the transaction (in the case of online transactions) or later when the device is in the online mode (in the case offline transactions).

The payment service 108 may include one or more processors 122 and memory 124, which may store an operating system 126, a payment processing module 128, a catalog management module 130, an inventory management module 132, an analysis module 134, a transaction module 136, a receipt module 138, a compatibility module 140, and database(s) 142. The payment processing module 128 may function to receive the information regarding the transaction from the merchant device(s) 116 and attempt to authorize the payment instrument 110 used to conduct the transaction. The payment processing module 128 may then send an indication of whether the payment instrument 110 has been approved or declined back to the merchant device(s) 116.

Generally, when a customer 104 and a merchant 102 enter into an electronic payment transaction, the transaction is processed by electronically transferring funds from a financial account associated with the customer 104 to a financial account associated with the merchant 102. As such, the payment processing module 128 may communicate with one or more computing devices of a card network (or "card payment network") 144, e.g., MasterCard®, VISA®, over the network 120 to conduct financial transactions electronically. The payment processing module 128 can also communicate with one or more computing devices of one or more banks 146, processing/acquiring services, or the like over the network 120. For example, the payment processing module 128 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue payment instrument(s) 110 to customer(s) 104, and may pay acquiring banks for purchases made by customer(s) 104 to which the issuing bank has issued the payment instrument(s) 110. Accordingly, in some examples, the computing device(s) of an acquiring bank may be included in the card payment network and may communicate with the computing devices of a card-issuing bank to obtain payment. Further, in some examples, a customer 104 may use a debit card instead of a credit card, in which case, the bank computing device(s) of a bank corresponding to the debit card may receive communications regarding a transaction in which the customer 104 is participating. Additionally, there may be computing devices of other financial institutions involved in some types of transactions or in alternative system architectures, and thus, the foregoing are merely several examples for discussion purposes.

In the example environment 100 of FIG. 1, the payment service 108 may manage catalog(s) 112 and inventory(s) 114 for merchant(s) 102. For instance, the catalog management module 130 may manage catalog(s) 112 stored in the database(s) 142. That is, in at least one example, the catalog management module 130 may receive instructions associated with modifying catalog(s) 112 and may update catalog(s) 112 based on the instructions. For instance, a merchant device 116 may send instructions to the payment service 108 which may identify a modification that is to be made to a catalog 112 associated with a merchant 102. As a result, the catalog management module 130 may modify the catalog 112 consistent with the instructions. In some examples, the instructions may be received from devices associated with merchants (e.g., merchant device(s) 116). In other examples, the instructions may be received from third-party sources or systems.

Additionally, the inventory management module 132 may manage inventory(s) 114 stored in the database(s) 142. That is, in at least one example, the inventory management module 132 may receive instructions associated with modifying inventory(s) 114 and may update respective inventory(s) 114 based on the instructions. For instance, a merchant device 116 may send instructions to the payment service 108 which may identify a modification that is to be made to an inventory 114 associated with a merchant 102. As a result, the inventory management module 132 may modify the inventory 114 consistent with the instructions. In some examples, the instructions may be received from devices associated with merchants (e.g., merchant device(s) 116). In other examples, the instructions may be received from third-party sources or systems.

For instance, the payment service 108 may store a first catalog 112 and a first inventory 114 associated with a first merchant 102. The first catalog 112 can indicate at least first items that the first merchant 102 offers for acquisition, such as at a physical establishment 118. The first inventory 114 can indicate a respective quantity for each of the first items that the first merchant 102 offers for acquisition. Additionally, the payment service 108 may store a second catalog 112 and a second inventory 114 associated with a second merchant 102. The second catalog can indicate at least second items that the second merchant 102 offers for acquisition, such as at the same physical establishment 118 as the first merchant 102 and/or a separate physical establishment 118. The second inventory 114 can indicate a respective quantity for each of the second items that the second merchant 102 offers for acquisition.

The first merchant 102 may decide to authorize the second merchant 102 to provide, for acquisition, one or more of the first items. As such, the first merchant 102 may utilize a first merchant device 116 to send a message (e.g., an instruction) to the payment service 108 that authorizes the second merchant 102 to provide, for acquisition, at least a first item associated with the first merchant 102, as represented by one of authorization message(s) 148. In some instances, the message can include an identifier of the first item, a quantity of the first item that the second merchant 102 is authorized to provide to customer(s) 104, a price of the first item (e.g., if the first merchant 102 changes the price), any commission (e.g., a percentage, such as 10%, or a set amount, such as $3) that the second merchant 102 is to receive based on a customer 104 acquiring the first item from the second merchant 102, and/or the like.

Based on receiving the message, the payment service 108 can utilize the catalog management module 130 to update the second catalog 112 associated with the second merchant 102. For instance, the catalog management module 130 can store, in association with the second catalog 112, a new data item representing the first item. In some instance, the catalog management module 130 can further store, in association with the second catalog 112, data indicating that the first item is associated with the first merchant 102 (e.g., that the first item is owned by the first merchant 102) and data indicating any commission that the second merchant 102 to receive by proving the first item for acquisition.

In some instances, the payment service 108 can further utilize the catalog management module 130 to update the first catalog 112 associated with the first merchant 102. For instance, the catalog management module 130 can store, in association with the first catalog 112, data indicating that the first merchant 102 has authorized the second merchant 102 to provide the first item for acquisition. In some instances, the catalog management module 130 can further store, in association with the first catalog 112, data indicating any commission that the second merchant is to receive by providing the first item for acquisition.

Additionally, the payment service 108 can utilize the inventory management module 132 to update the second inventory 114 associated with the second merchant 102. For instance, as discussed above, the message authorizing the second merchant 102 to provide the first item for acquisition may indicate a quantity for the first item that the second merchant 102 is authorized to provide. As such, the inventory management module 132 may update the second inventory to indicate the authorized quantity. For instance, the inventory management module 132 may store, in association with the second inventory 114, data indicating both the first item and the authorized quantity for the first item. In some instances, the inventory management module 132 may further store, in association with the second inventory 114, data indicating that the first item is associated with the first merchant 102.

In some instances, the payment service 108 can further utilize the inventory management module 132 to update the first inventory 114 associated with the first merchant 102. For instance, the inventory management module 132 can store, in association with the first catalog 114, data indicating the second merchant 102 is authorized to provide, for acquisition, a given quantity of the first item.

After updating the catalogs 112 and/or the inventories 114 of the merchants 102, the payment service 108 can process transactions that include items from each of the merchants 102. For instance, the payment service 108 can determine that the second merchant 102 is utilizing a merchant device 116 during a session (described below). Based on the determination, the payment service 108 can provide the merchant device 116 with access to the inventory 114 of the second merchant 102 and portions of the inventory 114 of the first merchant 102 that the second merchant 102 is authorized to provide. In some instances, the payment service 108 provides the access to the authorized items since the payment service 108 stored the data associated with the authorized items in associated with the inventory 114 of the second merchant 102. In some instances, the payment service 108 may not store the data, but just provide the merchant device 116 with access to the portions of the inventory 114 of the first merchant 102.

The payment service 108 can receive, from a merchant device 116 associated with the second merchant 102, a request to process a transaction between the second merchant 102 and a customer 104, as represented by one of the transaction request(s) 150. The request can indicate an identity of the second merchant 102, each of the items being acquired by the customer 104 during the transaction, price(s) associated with each of the items, a total price of the transaction, payment information associated with a payment instrument 110 of the customer 104, and/or the like. In response, the payment service 108 can attempt to authorize the payment instrument 110 for the total price of the transaction. The payment service 108 can then send a message back to the merchant device 116 associated with second merchant 102 that indicates that the payment instrument 110 was authorized for the total price of the transaction.

Additionally, the payment service 108 can utilize the transaction module 136 to analyze the transaction in order to determine the owners of each of the items being acquired by the customer 104 during the transaction For instance, the transaction module 136 may analyze the transaction information to determine that the transaction is for the first item associated with the first merchant 102 (e.g., owned by the first merchant 102) and at least a second item associated with the second merchant 102 (e.g., owned by the second merchant 102). For instance, the transaction module 136 may compare each of the items from the transaction with the second catalog 112 and/or the second inventory 114 to determine that the first item is associated with the first merchant 102 and the second item is associate with the second merchant 102. In some instances, the transaction module 136 can determine that the first item is associated with the first merchant 102 based on the data that the payment service 108 stored in association with the second catalog 112 and/or the second inventory 114.

Based on the determination, the payment service 108 can further utilize the transaction module 136 to determine how the funds received from the transaction are to be distributed between the first merchant 102 and the second merchant 102. In some instances, the transaction module 136 may determine that a first portion of the funds corresponding to the price of the first item is to be distributed to the first merchant and that a second portion of the funds corresponding to the price of the second item is to be distributed to the second merchant 102. In some instances, the transaction module 136 may further factor in any commission that the second merchant 102 is to receive based the customer 104 acquiring the first item.

For instance, as discussed above, the message authorizing the second merchant 102 to provide the first item for acquisition may indicate that the second merchant 102 is to receive a commission for each unit of the first item that a customer 104 acquires from the second merchant 102. In some instances, the commission can include a percentage of the price of the first item, such as 10$, 20%, or the like. In some instances, the commission can include a set monetary amount per unit, such as $1, $5, $10, or the like. As such, the transaction module 136 can determine the first portion and the second portion taking into consideration the indicated commission.

For example, the payment service 108 may process a transaction for the second merchant 102 in which the price of the first item is $5, the price of the second item is $3, and the total price of the transaction is $8. In some instances, such as when the second merchant 102 is not receive a commission, the transaction module 136 may determine that a first portion of the funds received from the transaction is to be distributed to the first merchant 102, such as the $5 corresponding to the price of the first item, and that a second portion of the funds is to be distributed to the second merchant 102, such as the $3 corresponding to the price of the second item. In other instances, such as when the second merchant is to receive a commission ($1 per unit sold of the first item), the transaction module 136 may determine that a first portion of the funds received from the transaction is to be distributed to the first merchant 102, such as the $4 corresponding to the price of the first item minus the commission, and that a second portion of the funds is to be distributed to the second merchant 102, such as the $4 corresponding to the price of the second item plus the commission for selling the first item.

The payment service 108 can then utilize the payment processing module 128 to communicate with the one or more computing devices of the card network and/or the one or more computing devices of the one or more banks to cause a transfer of funds that is based on the determined distribution. For instance, the payment processing module 128 can cause the first portion of the funds to be transferred to a financial account associated with the first merchant. Additionally, the payment processing module 128 can cause the second portion of the funds to be transferred to the financial account associated with the second merchant 102. In some instances, the first portion of the funds are transferred from a financial account associated with the customer 104 to the financial account associated with the first merchant 102, and the second portion of the funds are transferred from the financial account associated with the customer 104 to the financial account associated with the second merchant 102.

Based on processing the transaction, the payment service 108 can then utilize the receipt module 138 to generate a receipt for the transaction. The receipt for the transaction can indicate at least that the second merchant 102 conducted the transaction, the first item acquired by the customer 104, the price of the first item, the second item acquired by the customer 104, the price of the second item, the total price of the transaction, the date of the transaction, and/or the like. In some instances, the receipt can further indicate that the first item is associated with the first merchant 102. For instance, the receipt can indicate that the second merchant 102 provided the first item to the customer 104 on behalf of the first merchant 102. The payment service 108 can then send data representing the receipt to the merchant device 116 associated with the second merchant, as represented by one of receipt(s) 152, so that the second merchant 102 can provide the customer 104 with the receipt. Additionally, in some instances, the payment service 108 can send the data representing the receipt to an electronic device associated with the customer 104.

It should be noted that, although the example of FIG. 1 illustrates the payment service 108 as generating and providing the receipt, in some instances, the merchant device 116 associated with the second merchant 102 can include similar functionality to generate and provide the customer 104 with the receipt. For instance, after receiving, from the payment service 108, a message indicating that the payment instrument 110 of the customer 104 has been authorized for the transaction, the merchant device 116 can generate the receipt for the customer 104.

Based on processing the transaction, the payment service 108 can further utilize the inventory management module 132 to update each of the first inventory 114 and the second inventory 114. For instance, since the first merchant 102 now has one less unit of the first item in inventory, the inventory management module 132 can update the first inventory 114 to indicate the change in quantity of the first item (e.g., reduce the quantity by one unit). Additionally, the inventory management module 132 can update the second inventory 114 to indicate both the change in the quantity of the first item (e.g., reduce the quantity by one unit) and the change in the quantity of the second item (e.g., reduce the quantity by one unit).

In some instances, in addition to synchronizing the data between the merchants' catalog(s) 112 and/or inventory(s) 114, and then processing the cross-merchant transactions, the payment service 108 can provide recommendations to merchant(s) 102. For instance, the payment service 108 can utilize the compatibility module 140 to identify merchants 102 that are similar to one another. In some instances, the compatibility module 140 makes the determination by analyzing profiles 154 associated with the merchants 102 and calculating a similarity score based on the analyzes.

For instance, the payment service 108 can generate profiles 154 associated with the merchants 102. Each profile 154 can include one or more attributes associated with a respective merchant 102. The attributes can include a type of business associated with the respective merchant 102 (e.g., an indication of a Merchant Category Classification (MCC) code), a geographical location associated with the respective merchant 102, business hours associated with the respective merchant 102, and/or the like. The compatibility module 140 can then analyze the profiles 154 to identify merchants 102 that are similar to one another based on a similarity score.

For instance, the compatibility module 140 can identify a similarity based on two merchants 102 being involved in a similar type of business. For example, the compatibility module 140 can determine that the first merchant 102 is associated with a first type of business (e.g., a first MCC code), the second merchant 102 is associated with the second type of business (e.g., a second MCC code), and that the first type of business is deemed similar to the second type of business (e.g., the first MCC code matches the second MCC code). The compatibility module 140 can further identify a similarity based on merchants 102 being with a threshold distance (e.g., a block, mile, etc.) from one another. For instance, the compatibility module 140 can determine that a first geographic location of the first merchant 102 is within a second geographic location of the second merchant 102. Furthermore, the compatibility module 140 can identify a similarity based on business hours. For instance, the compatibility module 140 can identify that two merchants 102 include similar business hours, or the compatibility module 140 can identify that two merchants 102 include different business hours.

The compatibility module 140 can then calculate a compatibility score based on the one or more similarities. For instance, the compatibility module 140 can calculate a higher compatibility score when there are a greater number of similarities between two merchants 102, and calculate a lower compatibility score when there are zero or few similarities between two merchants 102. For instance, in some examples, when two merchants 102 are in a similar type of business, located within a threshold distance, and include similar business hours, the compatibility module 140 may calculate a high compatibility score (e.g., 100/100). However, when two merchants 102 are in different types of business, located outside of a threshold distance from one another, and include differing business hours, the compatibility module 140 may calculate a low compatibility score (e.g., 0/100).

The payment service 108 can then use the compatibility scores to analyze catalog(s) 112 and/or inventory(s) 114. For instance, the payment service 108 can use the analysis module 134 to analyze a first inventory 114 of a first merchant 102 and a second inventory 114 of a second merchant 102 that the payment service 108 determines to be compatible. In some instances, the payment service 108 determines that two merchants 108 are compatible when their compatibility score is greater than a threshold score (e.g., greater than 50%). To analyze the inventories 114, the analysis module 134 compares first items as indicated by the first inventory 114 to second items as indicated by the second inventory 114. Based on the comparison, the analysis module 134 can determine items that the first merchant 102 associated with the first inventory 114 and/or items that the second merchant 102 associated with the second merchant 102 should offer.

For instance, the analysis module 134 can determine that the second merchant 102 does not offer one or more of the first items that the first merchant 102 offers. The analysis module 134 can then determine that the second merchant 102 should offer the one or more first items of the first merchant 102 for acquisition. Since the first merchant 102 and the second merchant 102 were deemed to be compatible, the one or more first items that the analysis module 134 determines for the second merchant 102 should be similar to the second items already offered by the second merchant 102. As such, customers 104 that are shopping at the physical establishment of the second merchant 102 will likely acquire the one or more first items along with second items already provided by the second merchant 102.

In some instances, when making the determinations above, the payment service 108 can use "sessions" associated with the first merchant 102 and the second merchant 102. For instance, the first merchant 102 may use a first merchant device 116 to access the first inventory 114 during a first session. In some instances, the first session can correspond to the operating hours of the first merchant 102, which is when the first merchant will use the first inventory 114 to conduct transactions with customer 104. In some instances, the first session can correspond to other hours in which the first merchant 102 uses the first merchant device 116 to access the first inventory 114. Additionally, the second merchant 102 may use a second merchant device 116 to access the second inventory 114 during a second session. In some instances, the second session can correspond to the operating hours of the second merchant 102, which is when the second merchant 102 will use the second inventory 114 to conduct transactions with customers 104. In some instances, the second session can correspond to other hours in which the second merchant 102 uses the second merchant device 116 to access the second inventory 114.

The payment service 108 can then determine that the first session differs from the second session and as such, there are times that the first merchant 102 is conducting transactions using the first merchant device 116 that differ from when the second merchant 102 is conducting transactions using the second merchant device 116. Based on the determination, the payment service 108 can determine that the second merchant 102 should be authorized to provide the items of the first merchant 102 at times during the second session, and additionally or alternatively, at times during the second session that differ from the first session. In other words, the payment service 108 may provide the second merchant 102 with the capability (access to the first inventory 114) to provide the authorized items at times that the first merchant 102 is not conducting transactions with customers 104.

In addition to, or alternatively from, using the compatibility score to identify similar merchants 102, the payment service 108 can utilize the analysis module 134 to analyze the catalog(s) 112 and/or the inventory(s) 114 of merchant(s) 102 with respect to transaction information 156 in order to identify item(s) that the first merchant 102 should authorize the second merchant 102 to provide, for acquisition, to customer(s) 104. The transaction information 156 for a respective transaction can indicate an identifier of a merchant 102, an identifier (e.g., name) of a customer 104, payment information associated with a payment instrument 110 used by the customer 104 during the respective transaction, item(s)/service(s) 106 acquired by the customer 104 during the respective transaction, a price of the item(s)/service(s) 106 acquired by the customer 104 during the respective transaction, a time, place and date of the respective transaction, and so forth. The transaction information 156 can be associated with the first merchant 102, the second merchant 102, and/or any other merchants 102.

To perform the analysis, in some instances, the analysis module 134 can analyze the second catalog 112 and/or the second inventory 114 of the second merchant 102 to identify the second items offered for acquisition by the second merchant 102. Using the transaction information 156, the analysis module 134 can then compare the second items with items acquired by customers 104 during respective transactions in order to determine that, during at least one of the transactions (and/or a threshold number of transaction, such as one transaction, five transactions, ten transactions, or the like, and/or threshold percentage of transactions, such as one percent of the transactions, five percent of the transactions, ten percent of the transactions, or the like), a customer 104 acquired the first item along with one or more of the second items. In some instances, the analysis module 134 can further determine, based on the second catalog 112 and/or second inventory 114, that the second merchant 102 does not already provide the first item for acquisition. Based on the determinations, the analysis module 134 can generate a message recommending that the second merchant 102 offer the first item for acquisition. The payment service 108 can then send the message to the merchant device 116 associated with the second merchant 102, as represented by one of message(s) 158.

The analysis module 134 can further analyze the catalog(s) 112 and/or inventory(s) 114 of other merchant(s) 102 to determine at least one merchant 102 that already provides the first item for acquisition, and add an indication of the at least one merchant 102 in the message. In some instances, the analysis module 134 analyzes catalog(s) 112 and/or inventory(s) 114 of other merchant(s) 102 that are within a threshold distance (e.g., one block, one mile, ten miles, or the like) to the second merchant 102 (e.g., based on the attributes from the profiles 154). For instance, the analysis module 134 can determine geographic locations associated with the other merchant(s) 102 as well as a geographic location associated with the second merchant 102. The analysis module 134 can then identify one more merchant(s) 102 whose respective geographic location is within a threshold distance to the geographic location of the second merchant 102.

In some instances, in addition to, or alternatively from using the threshold distance, the analysis module 134 may identify one or more other merchant(s) 102 that are similar to the second merchant 102 (based on the attributes from the profiles 154). For example, the analysis module 134 may analyze the catalog(s) 112 and/or inventory(s) 114 of other merchant(s) 102 to identify one or more merchant(s) 102 that provide similar items as the second merchant 102. For another example, the analysis module 134 may identify one or more other merchant(s) 102 that are involved in a similar type business as the second merchant 102 (similar to the discussion above with regard to the compatibility module 140). In some instances, the analysis module 134 can determine that two merchants 102 are in a similar type of business based on both merchants 102 being retail merchants, restaurant merchants, or the like. In some instances, the analysis module 134 can determine that two merchants 102 are in a similar type business based on both merchants 102 being associated with a similar business code MCC code. For instance, the analysis module 134 can determine that a first type of business (e.g., a first MCC code) associated with the first merchant 102 is deemed similar to a second type of business (e.g., a second MCC code).

After identifying at least one merchant 102, such as the first merchant 102, the analysis module 134 can analyze the first catalog 112 and/or the first inventory 114 of the first merchant 102 to determine that the first merchant 102 offers the first item for acquisition. Based on the determination, the analysis module 134 can generate the message such that the message further indicates that the first merchant 102 provides the first item for acquisition. As such, the second merchant 102 can receive the message from the payment service 108 and, in response, communicate with the first merchant 102 to try and create a contract in which the second merchant 102 provides the first item for the first merchant 102.

In some instances, in addition to, or alternatively from, sending the recommendation to the second merchant 102, the payment service 108 can generate and send a recommendation to the first merchant 102. For instance, the analysis module 134 can analyze the first catalog 112 and/or the first inventory 114 of the first merchant 102 to identify the first items offered for acquisition by the first merchant 102. Using the transaction information 156, the analysis module 134 can then compare the first items with items acquired by customers 104 during respective transactions in order to determine that, during at least one of the transactions (and/or a threshold number or threshold percentage of transactions), a customer 104 acquired the first item along with at least a second item. In some instances, the analysis module 134 can further determine, from the first items, that the first merchant 102 does not already offer the second item for acquisition. The analysis module 134 can then analyze catalog(s) 112 and/or inventory(s) 114 of other merchant(s) 102 to identify at least one merchant 102 that offers the second item for acquisition.

For instance, the analysis module 134 can perform similar techniques as above to identify one or more merchant(s) 102 that are within a threshold distance of the first merchant 102 and/or similar to the first merchant 102, such as the second merchant 102. The analysis module 134 can analyze the second catalog 112 and/or the second inventory 114 of the second merchant 102 to determine that the second merchant 102 offers the second item for acquisition. Based on the determination, the analysis module 134 can generate a message that recommends that the first merchant 102 authorize the second merchant 102 to provide, for acquisition, the first item of the first merchant. In some instances, the message may further recommend a quantity of the first item that the first merchant 102 should authorize. The payment service 108 can then send the message to a merchant device 116 associated with the first merchant 102.

In should be noted that, in some instances, the merchant(s) 102 may be conducting transaction with customer(s) 104 outside of physical establishment(s) 118. For instance, the customer(s) 104 may be using respective electronic device(s) to purchase item(s)/service(s) 106 from merchant(s) 102 via e-commerce businesses associated with the merchant(s) 102. Additionally, in some instances, respective catalog(s) 112 and respective inventory(s) 114 for respective merchant(s) 102 may include single data structures that store some of and/or all of the data included within the respective catalog(s) 112 and respective inventory(s) 114. As such, when techniques and examples describe utilizing a catalog 112 or an inventory 114, the same techniques and examples can be performed using either a catalog 112, an inventory 114, or both.

Additionally, it should be noted that the analysis module 134 can determine a quantity for an item that the first merchant 102 should authorize the second merchant 102 to provide. For instance, the analysis module 134 can analyze transaction information 156 to determine what other merchants 102, which are deemed similar to the second merchant 102 and/or within a threshold distance to the second merchant 102, sell during different time periods. The analysis module 134 can then determine the quantity based on the determination. For instance, the analysis module 134 can determine that the first merchant offer the lowest, average, highest, or the like that other merchants 102 that are deemed similar to the second merchant 102 sell.

It should further be noted that, in some instances, the commission provided to a merchant 102 that sells another merchant's 102 items can be based on many factors. In some instances, as discussed above, one of the merchants 102 can set the commission. For instance, the commission can be a given monetary value (e.g., $X per unit sold) or a percentage of the cost of the item (e.g., X % of the cost of the product). Additionally, in some instances, the commission may be determined based the time of day. For instances, the commission may be greater at lunch time, but be lower at dinner time. Additionally, in some instances, the commission can be based on the number of units the merchant sells. For instance, the merchant may get a first commission per unit sold if the merchant sells a first number of units, but get a second, greater commission per unit sold by selling a second, greater number of units.

In the example of FIG. 1, the payment service 108 further includes network interface(s) 160. The network interface(s) 160, along with any other network interface(s) described herein, may include one or more interfaces and hardware components for enabling communication with various other devices over the network 120 or directly. For example, network interface(s) may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

As discussed herein, processor(s), such as processor(s) 122, may comprise one or more processors or processing cores. For example, the processor(s) can be implemented as one or more microprocessors, microcomputers, microcontrollers, digital signal processors, central processing units, state machines, logic circuitries, and/or any devices that manipulate signals based on operational instructions. In some cases, the processor(s) may be one or more hardware processors and/or logic circuits of any suitable type specifically programmed or configured to execute the algorithms and processes described herein. The processor(s) can be configured to fetch and execute computer-readable processor-executable instructions stored in the memory.

Additionally, as discussed herein, memory, such as memory 124, may be an example of tangible non-transitory computer storage media and may include volatile and non-volatile memory and/or removable and non-removable media implemented in any type of technology for storage of information such as computer-readable processor-executable instructions, data structures, program modules or other data. The memory may include, but is not limited to, RAM, ROM, EEPROM, flash memory, solid-state storage, magnetic disk storage, optical storage, and/or other computer-readable media technology. Further, in some cases, devices, such as merchant device(s), the payment service 108, a customer device, or the like, can access external storage, such as RAID storage systems, storage arrays, network attached storage, storage area networks, cloud storage, or any other medium that can be used to store information and that can be accessed by the processor(s) directly or through another computing device or network. Accordingly, the memory may be computer storage media able to store instructions, modules or components that may be executed by the processor(s). Further, when mentioned, non-transitory computer-readable media exclude media such as energy, carrier signals, electromagnetic waves, and signals per se.

Additional functional components of the payment service 108 may include an operating system 126 for controlling and managing various functions of the payment service 108 and for enabling basic user interactions with the payment service 108.

Figure 2:
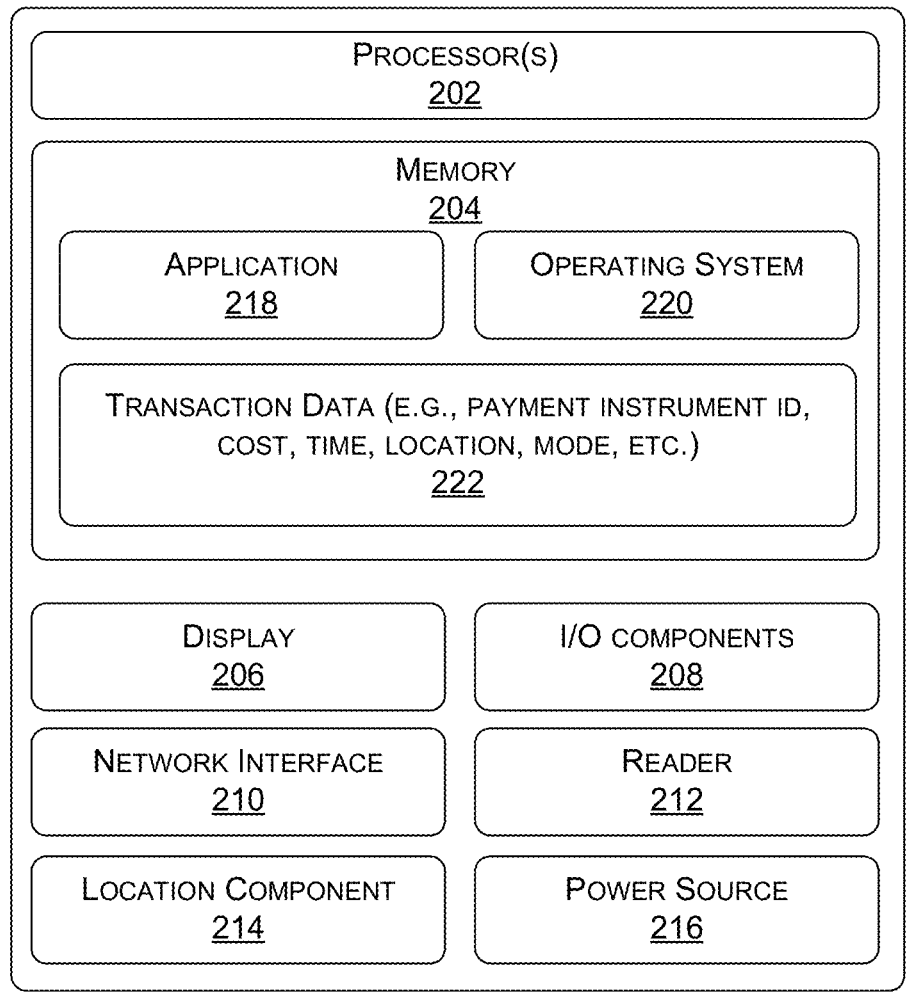
FIG. 2 illustrates components of a merchant device.

FIG. 2 illustrates select example components of an example merchant device 200 according to some implementations. The merchant device 200 may include any of the merchant device(s) 116 from FIG. 1. The merchant device 200 may be any suitable type of computing device, e.g., mobile, semi-mobile, semi-stationary, or stationary. Some examples of the merchant device 200 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the merchant device 200 includes at least one processor 202, memory 204, a display 206, one or more input/output (I/O) components 208, one or more network interfaces 210, at least one card reader 212, at least one location component 214, and at least one power source 216. Each processor 202 may itself comprise one or more processors or processing cores. For example, the processor 202 can be implemented as one or more microprocessors, microcomputers, microcontrollers, digital signal processors, central processing units, state machines, logic circuitries, and/or any devices that manipulate signals based on operational instructions. In some cases, the processor 202 may be one or more hardware processors and/or logic circuits of any suitable type specifically programmed or configured to execute the algorithms and processes described herein. The processor 202 can be configured to fetch and execute computer-readable processor-executable instructions stored in the memory 204.

Depending on the configuration of the merchant device 200, the memory 204 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 204 may include, but is not limited to, RAM, ROM, EEPROM, flash memory, solid-state storage, magnetic disk storage, optical storage, and/or other computer-readable media technology. Further, in some cases, the merchant device 200 may access external storage, such as RAID storage systems, storage arrays, network attached storage, storage area networks, cloud storage, or any other medium that can be used to store information and that can be accessed by the processor 202 directly or through another computing device or network. Accordingly, the memory 204 may be computer storage media able to store instructions, modules or components that may be executed by the processor 202. Further, when mentioned, non-transitory computer-readable media exclude media such as energy, carrier signals, electromagnetic waves, and signals per se.

The memory 204 may be used to store and maintain any number of functional components that are executable by the processor 202. In some implementations, these functional components comprise instructions or programs that are executable by the processor 202 and that, when executed, implement operational logic for performing the actions and services attributed above to the merchant device 200.

Functional components of the merchant device 200 stored in the memory 204 may include a merchant application 218, which may interact with applications executing on client devices to allow customers to pay for items offered by the merchant. The merchant application 218 may present an interface on the merchant device 200 to enable the merchant to conduct transactions, receive payments, and so forth, as well as communicating with the payment service for processing payments and sending transaction information. Further, the merchant application 218 may present an interface to enable the merchant to manage the merchant's account, and the like. Finally, the merchant application 218 may send data associated with the merchant to the payment service, and receive suggested gift card orders and values to associate with gift cards from the payment service.

Additional functional components may include the operating system 220 for controlling and managing various functions of the merchant device 200 and for enabling basic user interactions with the merchant device 200. The memory 204 may also store transaction data 222 that is received based on the merchant associated with the merchant device 200 engaging in various transactions with customers, such as customer(s) 104 from FIG. 1.

In addition, the memory 204 may also store data, data structures and the like, that are used by the functional components. For example, this data may include item information that includes information about the items offered by the merchant, which may include images of the items, descriptions of the items, prices of the items, and so forth. Depending on the type of the merchant device 200, the memory 204 may also optionally include other functional components and data, which may include programs, drivers, etc., and the data used or generated by the functional components. Further, the merchant device 200 may include many other logical, programmatic and physical components, of which those described are merely examples that are related to the discussion herein.

The network interface(s) 210 may include one or more interfaces and hardware components for enabling communication with various other devices over the network or directly. For example, network interface(s) 210 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 2 further illustrates that the merchant device 200 may include the display 206 mentioned above. Depending on the type of computing device used as the merchant device 200, the display 206 may employ any suitable display technology. For example, the display 206 may be a liquid crystal display, a plasma display, a light emitting diode display, an OLED (organic light-emitting diode) display, an electronic paper display, or any other suitable type of display able to present digital content thereon. In some examples, the display 206 may have a touch sensor associated with the display 206 to provide a touchscreen display configured to receive touch inputs for enabling interaction with a graphic interface presented on the display 206. Accordingly, implementations herein are not limited to any particular display technology. Alternatively, in some examples, the merchant device 200 may not include the display 206, and information may be present by other means, such as aurally.

The I/O components 208, meanwhile, may include speakers, a microphone, a camera, and various user controls (e.g., buttons, a joystick, a keyboard, a keypad, etc.), a haptic output device, and so forth. For instance, I/O components 208 can include a printing device for printing physical receipts for customers. In some examples, the POS device uses the printing device to print the physical receipts after receiving data representing the receipts from a payment service.

It should be noted that, in some examples, the I/O components 208 may be separate from the merchant device 200. For instance, the printing device may be separate from the merchant device 200. In some examples, the merchant device 200 sends data representing the receipts to the printing device in order to cause the printing device to print physical receipts.

In addition, the merchant device 200 may include or may be connectable to a payment instrument reader 212. In some examples, the reader 212 may plug in to a port in the merchant device 200, such as a microphone/headphone port, a data port, or other suitable port. In other instances, the reader 212 is integral with the entire merchant device 200. The reader 212 may include a read head for reading a magnetic strip of a payment card, and further may include encryption technology for encrypting the information read from the magnetic strip. Alternatively, numerous other types of card readers may be employed with the merchant device 200 herein, depending on the type and configuration of a particular merchant device 200.

The location component 214 may include a GPS device able to indicate location information, or the location component 214 may comprise another other location-based sensor. The merchant device 200 may also include one or more additional sensors (not shown), such as an accelerometer, gyroscope, compass, proximity sensor, and the like. Additionally, the merchant device 200 may include various other components that are not shown, examples of which include removable storage, a power control unit, and so forth.

Figure 3:
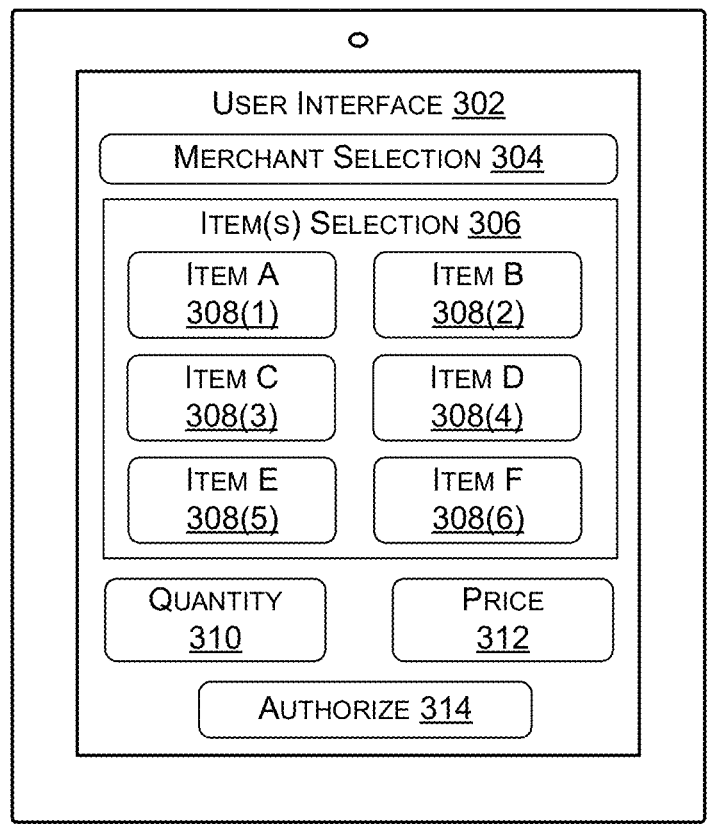
FIG. 3 illustrates an example user interface for authorizing a merchant to offer items/services for acquisition.

FIG. 3 illustrates an example of a merchant device 300, which may represent the merchant device 200, providing a user interface 302 that a first merchant can use to authorize a second merchant to offer items/services for acquisition. As illustrated, the user interface 302 includes a merchant selection 304 field for inputting the identity of the second merchant for which authorization is to be provided. In some instances, the merchant selection 304 field can include a search box in which the first merchant can input plaintext (e.g., one or more words) that indicates the second merchant (e.g., an identity of the second merchant). In some instances, the merchant selection 304 field can include a drop-down menu that includes a list of merchants for selection. Still, in some instances, the merchant selection 304 field can include any type of input field that allows the first merchant to identify the second merchant.

The user interface 302 further includes an item(s) selection 306 field for selecting which items 308(1)-(6) the second merchant is authorized to provide for acquisition. Although the item(s) selection 306 field includes six items 308(1)-(6), in other examples, the item(s) selection 306 field can include any number of items. To select an item, the first merchant utilizing the user interface 302 can provide input selecting one or more of the items 308(1)-(6). For instance, each of the items 308(1)-(6) may correspond to a graphical button that allows the first merchant to select the respective item 308(1)-(6). Based on a selection of a respective item 308(1)-(6), the user interface 302 will add the respective item 308(1)-(6) to the one or more items 308(1)-(6) that the first merchant is authorizing the second merchant to provide for acquisition.

The user interface 302 further includes a quantity 310 field that the first merchant can use to enter the authorized quantity (e.g., 1, 5, 10, etc.) for each selected item 308(1)-(6), and a price 310 field that the first merchant can use to enter a price (e.g., $1, $5, $10, etc.) for each selected item 308(1)-(6). Each of the quantity 310 field and the price 312 field may include any type of input field that allows the first merchant to enter the respective quantity and price. For instance, each of the quantity 310 field and the price 312 field may allow the user to input a respective the quantity and price, may include a drop-down menu for selecting the respective quantity and price, or the like.

The user interface 302 further includes an authorization 314 button that the first merchant can select to authorize the second merchant to provide the one or more selected items 308(1)-(6) at the respective quantity and price for acquisition. For instance, the merchant device 300 can receive, via the authorization 314 button, input indicating that the first merchant is authorizing the second merchant to provide one or more selected item 308(1)-(6) for acquisition. In response, the merchant device 300 can send a message (e.g., an authorization message 148 from FIG. 1) to the payment service that authorizes a second merchant to provide, for acquisition, the one or more selected items 308(1)-(6).

Figure 4:
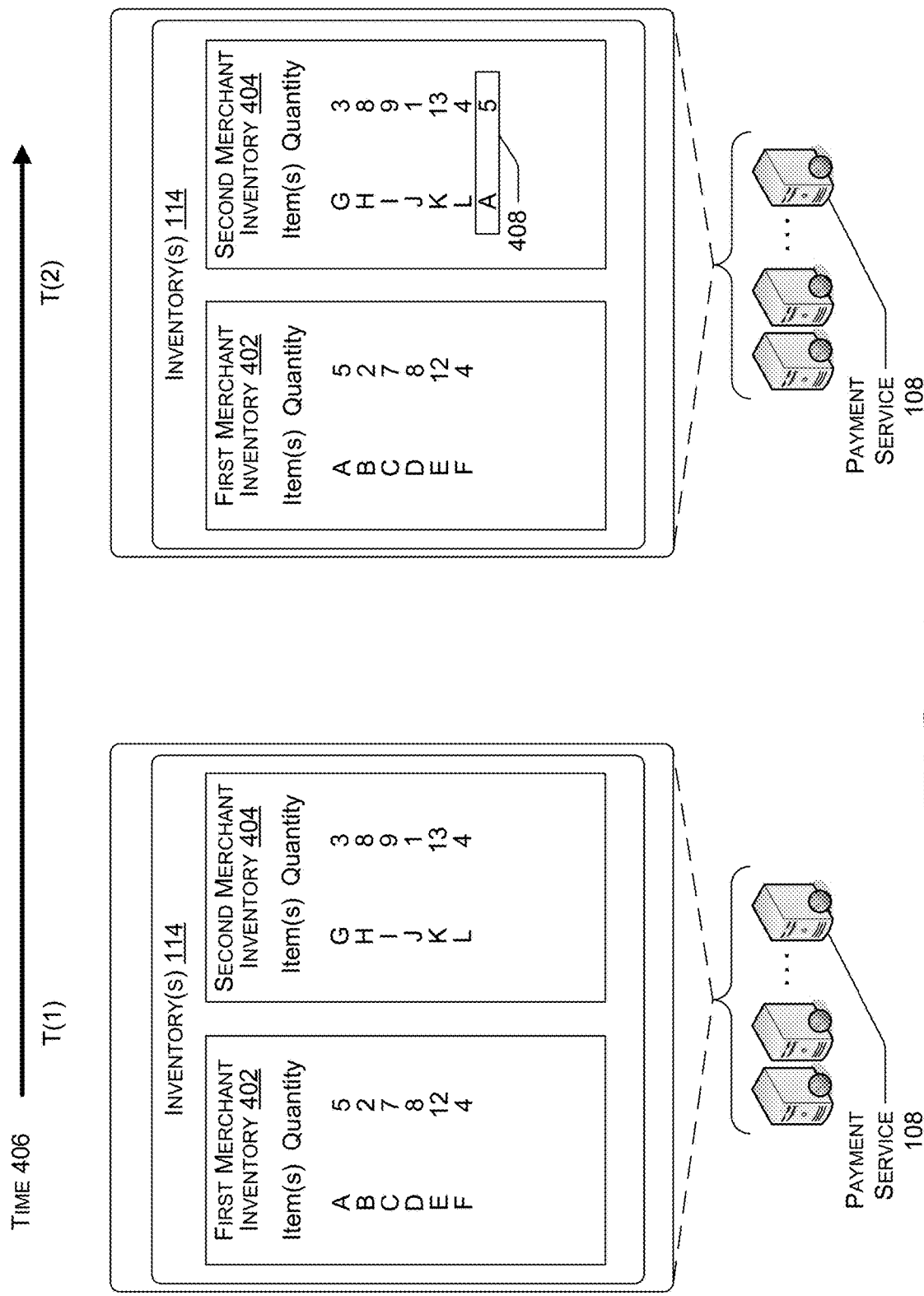
FIG. 4 illustrates an example of a payment service synchronizing data between inventories based on receiving an authorization.

FIG. 4 illustrates an example of a payment service 108 synchronizing data between inventories 114 of respective merchants based on receiving an authorization. For instance, in the example of FIG. 4, the payment service 108 may store a first inventory 402 for a first merchant and a second inventory 404 for a second merchant. As shown, at time 406 T(1), the first inventory 402 indicates that the first merchant has five units of Item A, two units of Item B, seven units of Item C, eight units of Item D, twelve units of item E, and four units of Item F. Additionally, the second inventory 404 indicates that the second merchant has three units of Item G, eight units of Item H, one unit of Item J, thirteen units of Item K, and four units of Item L.

In the example of FIG. 4, at time 406 T(2), the payment service 108 may receive a message from the first merchant that authorizes the second merchant to provide five units (e.g., a quantity) of Item A for acquisition. In response, the payment service 108 updates the second inventory 404 of the second merchant. For instance, the payment service 108 can update the second inventory 404 such that the second inventory 404 indicates that the second merchant has the five units of Item A. Additionally, the payment service 108 can store an indicator 408 that indicates that Item A is associated with the first merchant (e.g., owned by the first merchant). In some instances, the indicator 408 can include data that associates Item A with the first merchant and/or the first inventory 402.

During a transaction in which a customer acquires at least Item A from the second merchant, the payment service 108 can use the indicator 408 to determine that Item A is actually associated with the first merchant. For instance, the payment service 108 can analyze the second inventory 404 to determine that the second inventory 404 includes the indicator 408. The payment service 108 can then distribute at least a portion of the funds received from the transaction to the first merchant based on the determination.

Although the example of FIG. 4 illustrates the payment service 108 updating the inventories 114 of the respective merchants, in some instances, the payment service 108 can perform a similar process to update the catalogs 112 of the respective merchants. For instance, at time 406 T(2), the payment service 108 may update a catalog 112 of the second merchant to indicate Item A. The payment service 108 may further store an indicator in association with the catalog 112 that indicates that Item A is associated with the first merchant.

Figure 5:
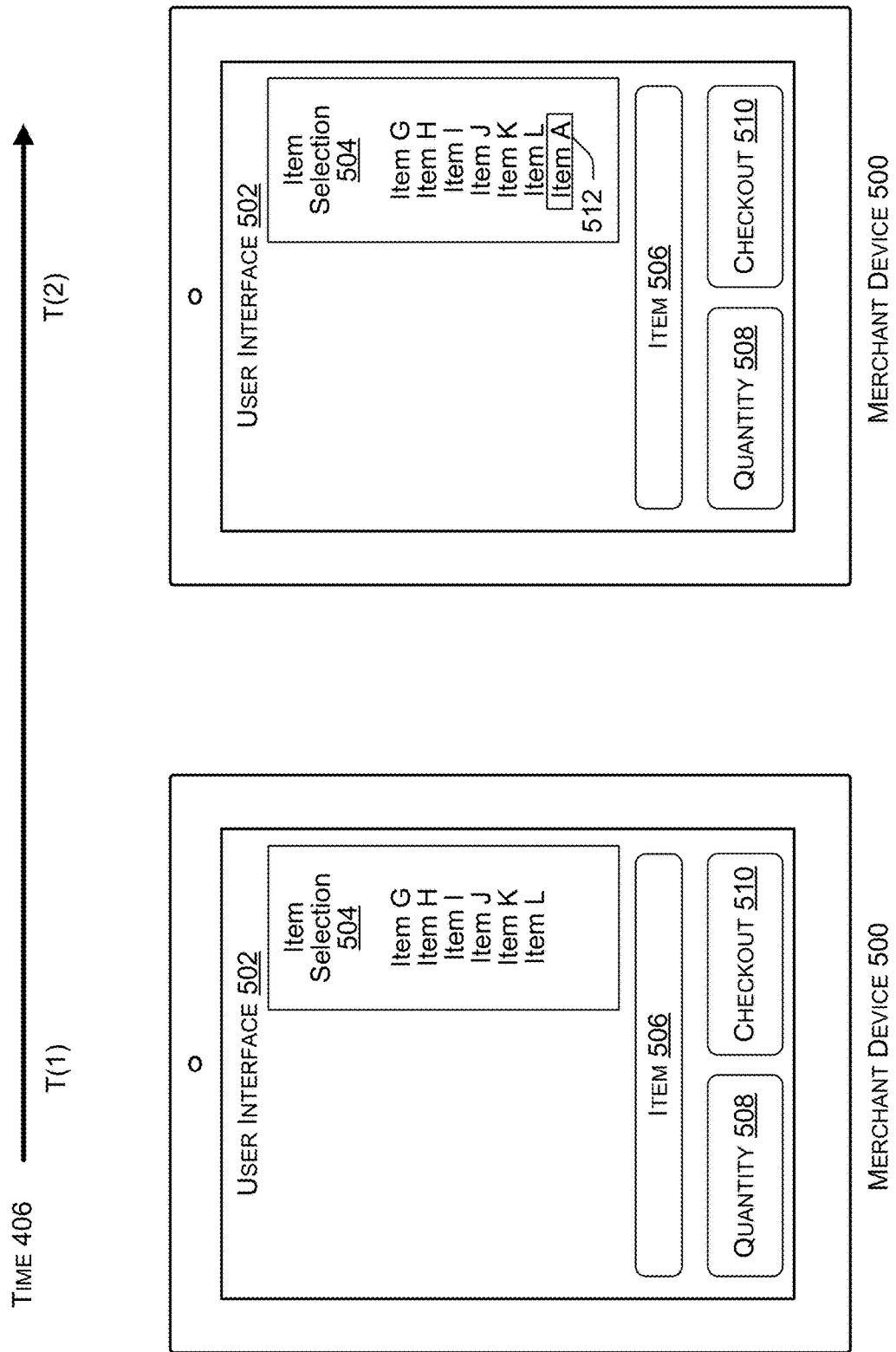
FIG. 5 illustrates an example of updating a user interface based on adding an item to an inventory.

FIG. 5 illustrates an example of a merchant device 500, which may represent the merchant device 200, updating a user interface 502 based on adding an item to an inventory. The user interface 502 may be utilized by a merchant, such as the second merchant described with reference to FIG. 4, during the course of business to conduct transactions with customers. For instance, as shown in the example of FIG. 5, the user interface 502 includes an item selection 504 field in which the merchant can select an item being acquired during a transaction, an item 506 input field that the merchant can use to input items being acquired by merchants that are not already included in the item selection 504 field, a quantity 508 field that the merchant can use to input a quantity of each item being acquired, and a checkout 510 field that the merchant can use to process the transaction after each item is input into the merchant device 500.

At time 406 T(1), the item selection 502 field includes Items G-L for the merchant's selection. For instance, Items G-L may include top selling items at the physical establishment of the merchant and as such, the item selection 504 field may include Items G-L for quick selection by the merchant. Later, at time 406 T(2), such as when the payment service 108 updated the second inventory 404 in FIG. 4, the user interface updates the item selection 504 field to include an indication of Item A. Additionally, the user interface 502 provides an indication 512 that may indicate that Item A is associated with another merchant (e.g., owned by the first merchant from FIG. 4).

Figure 6:
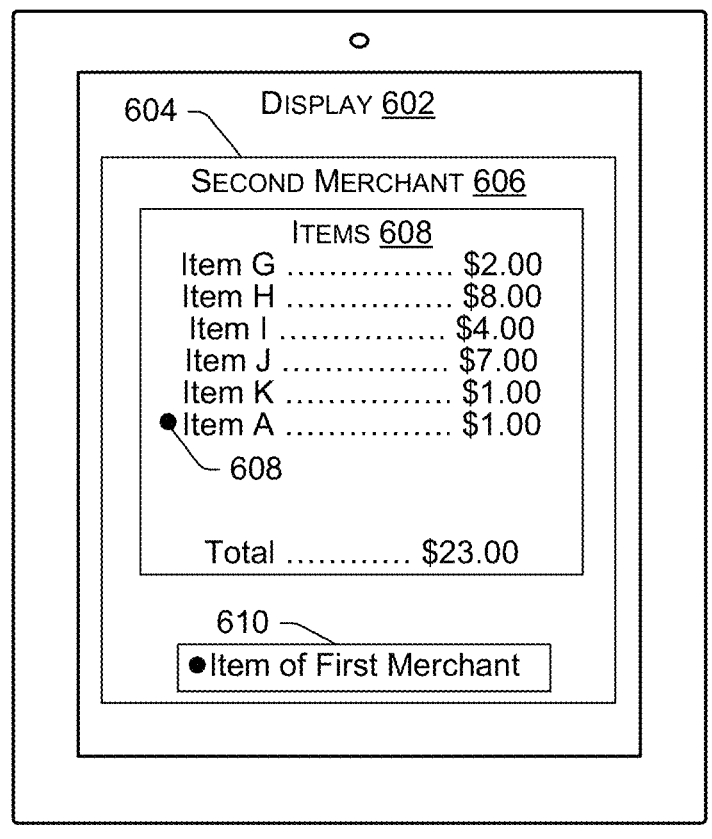
FIG. 6 illustrates an example of a receipt that may be generated for a transaction involving multiple merchants.

FIG. 6 illustrates an example of a merchant device 600, which may represent the merchant device 200, displaying, via a display 602, a receipt 604 associated with a cross-merchant transaction. As shown, the receipt 604 includes an indication 606 that the second merchant conducted the transaction with the customer. The receipt 604 also includes a listing of the items 608 that were acquired during the transaction, a respective price for each of the items, and a total price of the transaction. Additionally, next to Item A, the receipt includes an indicator 610 that indicates that Item A is associated with the first merchant. To identify that Item A is associated with the first merchant, the receipt further provides an index 610 that identifies each indicator 608 included within the receipt 604. For instance, in the example of FIG. 6, the index 610 identifies that the indicator 608 associates items with the first merchant.

Figure 7:
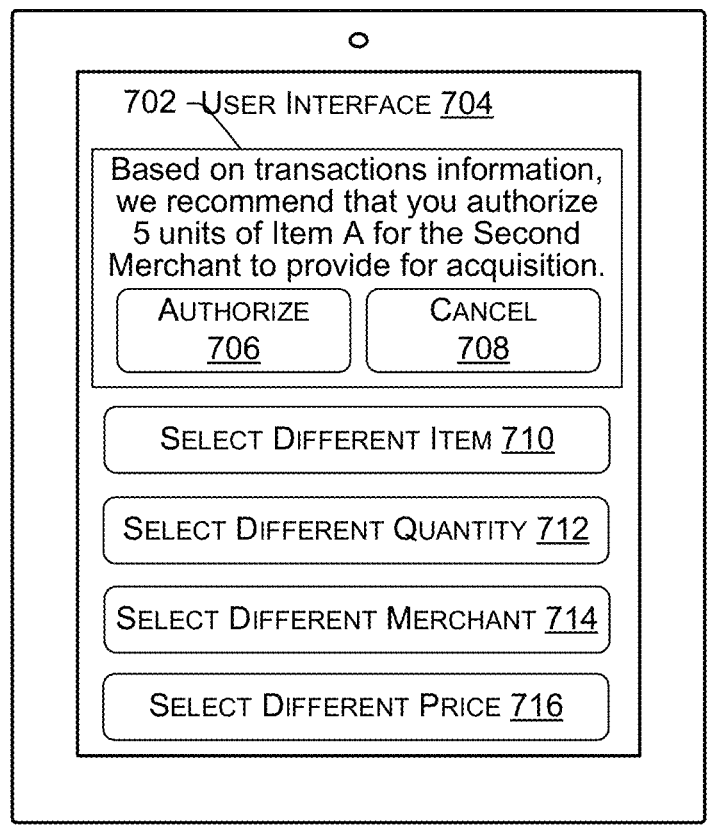
FIG. 7 illustrates an example of a recommendation indicating that a first merchant should authorize a second merchant to provide an item for acquisition.

FIG. 7 illustrates an example of a merchant device 700, which may represent the merchant device 200, providing a recommendation 702 to a merchant via a user interface 704. For instance, a payment service may analyze transaction information with respect to an inventory of a merchant, using the techniques described above, in order to recommend that a first merchant authorize a second merchant to provide an item for acquisition. The payment service can then send a message that includes the recommendation to a merchant device 700 of the first merchant. Based on receiving the message, the merchant device 700 can display the user interface 704 that includes the recommendation 702 to the first merchant. As shown, the recommendation 702 indicates that the first merchant should authorize the second merchant to provide five units of Item A for acquisition.

The recommendation 702 further includes an authorize 706 button that the first merchant can use to authorize the second merchant to provide the five units of Item A for acquisition. For instance, the merchant device 700 can receive input indicating a selection of the authorize 706 button and, in response, send a message indicating the authorization to the payment service. Furthermore, the recommendation 702 includes a cancel 708 button that the first merchant can use to not authorize the second merchant to provide the five units of Item A for acquisition. For instance, the merchant device 700 can receive input indicating a selection of the cancel 708 button and, in response, send a message indicating the cancellation to the payment service.

The user interface 704 further includes a select different item 710 field that the first merchant can use to select a different item for authorization, a select different quantity 712 field that the first merchant can use to select a different quantity of Item A for authorization, a select different merchant 714 field that the first merchant can use to select a different merchant for authorization, and a select different price 716 field that the first merchant can use to input a specific price for Item A.

Figure 8:
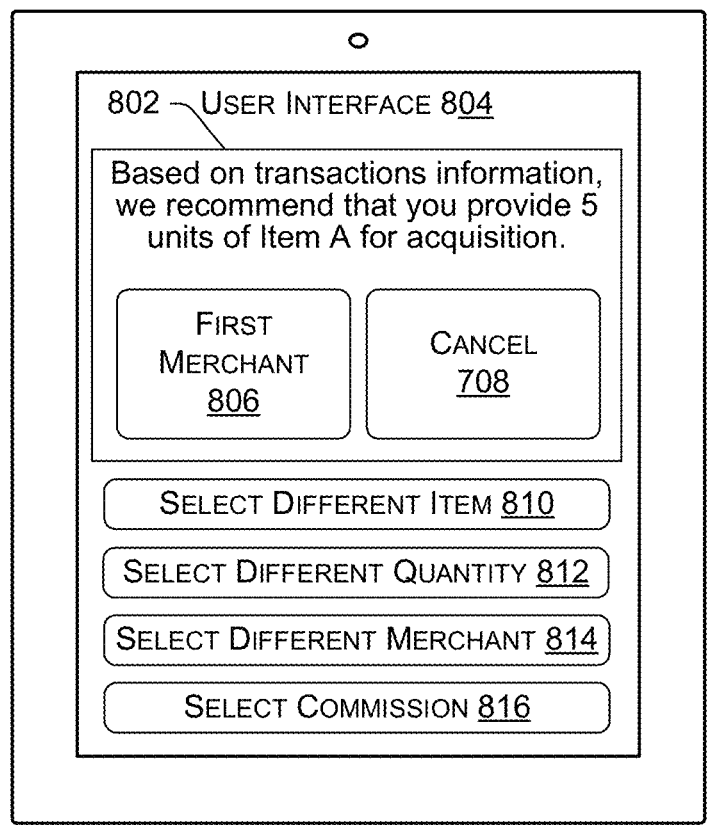
FIG. 8 illustrates an example of a recommendation indicating that a first merchant should request authorization to provide an item for acquisition from a second merchant.

FIG. 8 illustrates an example of a merchant device 800, which may represent the merchant device 200, providing a recommendation 802 to a merchant via a user interface 804. Unlike the recommendation 702 from FIG. 7, the recommendation 802 may be directed to the second merchant and indicate that the second merchant should request authorization from the first merchant to provide the five units of Item A for acquisition. As such, the recommendation 802 includes a first selection 806 button that the second merchant can select to send a request for authorization. For instance, the merchant device 800 can receive input indicating a selection of the first selection 806 button and, in response, send a message to the payment service that indicates that the second merchant would like to request authorization from the first merchant. The payment service can receive the message and send a message that includes a recommendation, such as the recommendation 702, to the first merchant in response.

Furthermore, the recommendation 802 includes a cancel 808 button that the second merchant can use to indicate that the second merchant does not want to request authorization for providing Item A. For instance, the merchant device 800 can receive input indicating a selection of the cancel 808 button and, in response, send a message indicating the cancellation to the payment service.

The user interface 804 further includes a select different item 810 field that the second merchant can use to select a different item for authorization (e.g., an item other than Item A that is also provided by the first merchant), a select different quantity 812 field that the second merchant can use to select a different quantity of Item A for authorization, a select different merchant 814 field that the second merchant can use to select a different merchant for authorization, and a select commission 816 field that the second merchant can use to input a specific commission for providing Item A for acquisition.

Figure 9A:
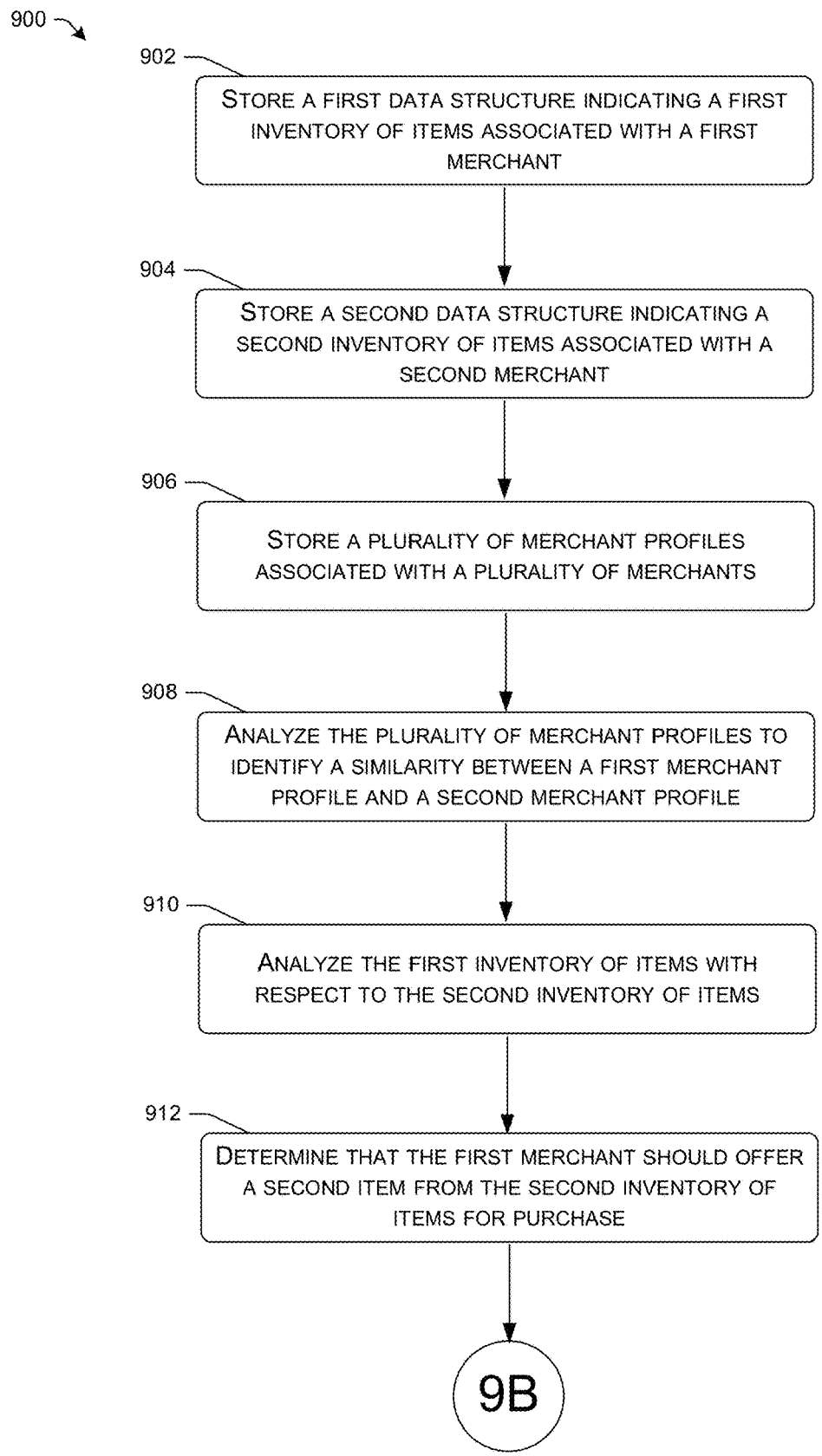
FIGS. 9A-9C illustrate a flow diagram of an example process for synchronizing data between merchants' inventories, and then utilizing the data synchronization to process a cross-merchant transaction.
Figure 9B:
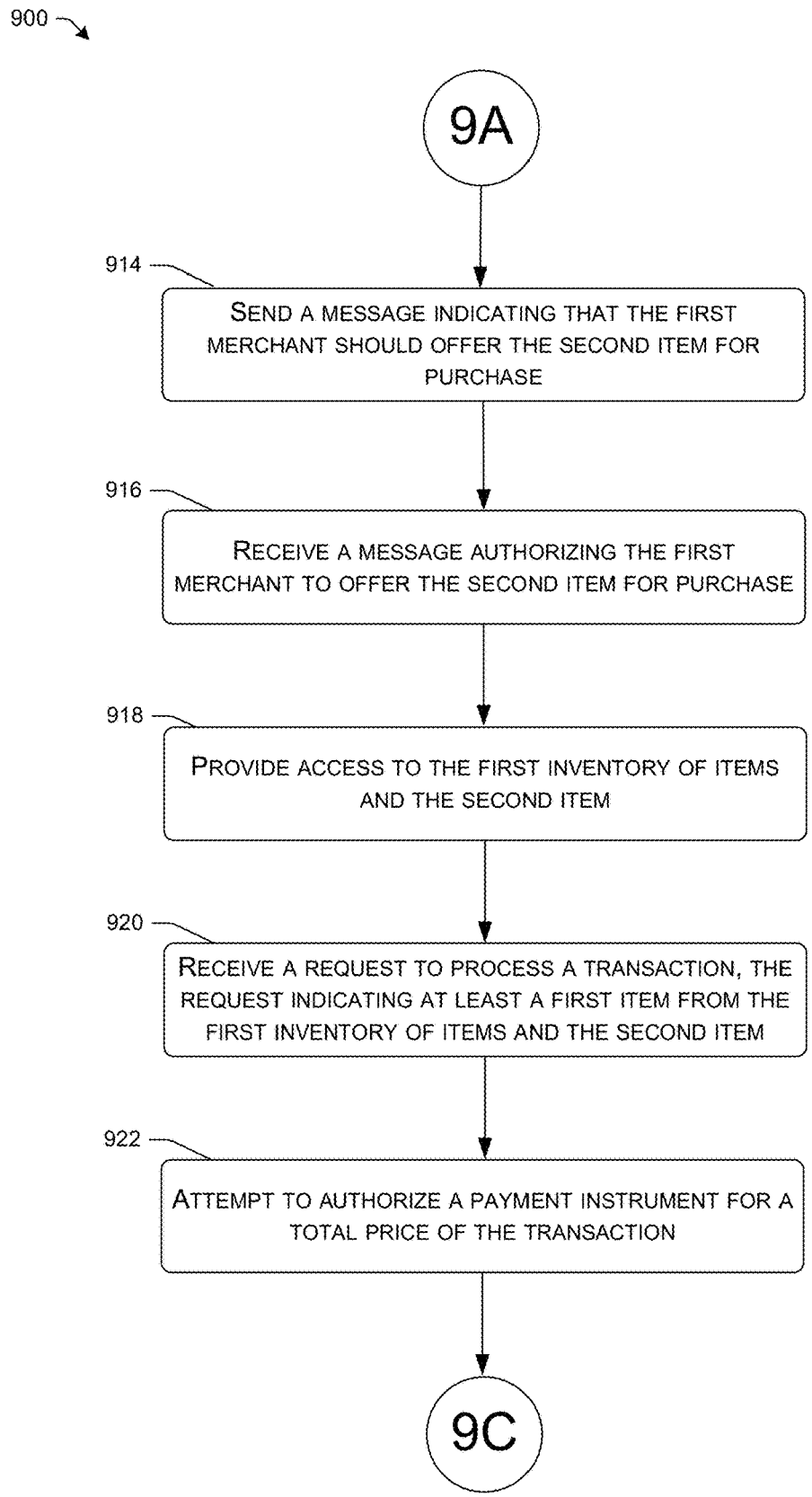
Figure 9C:
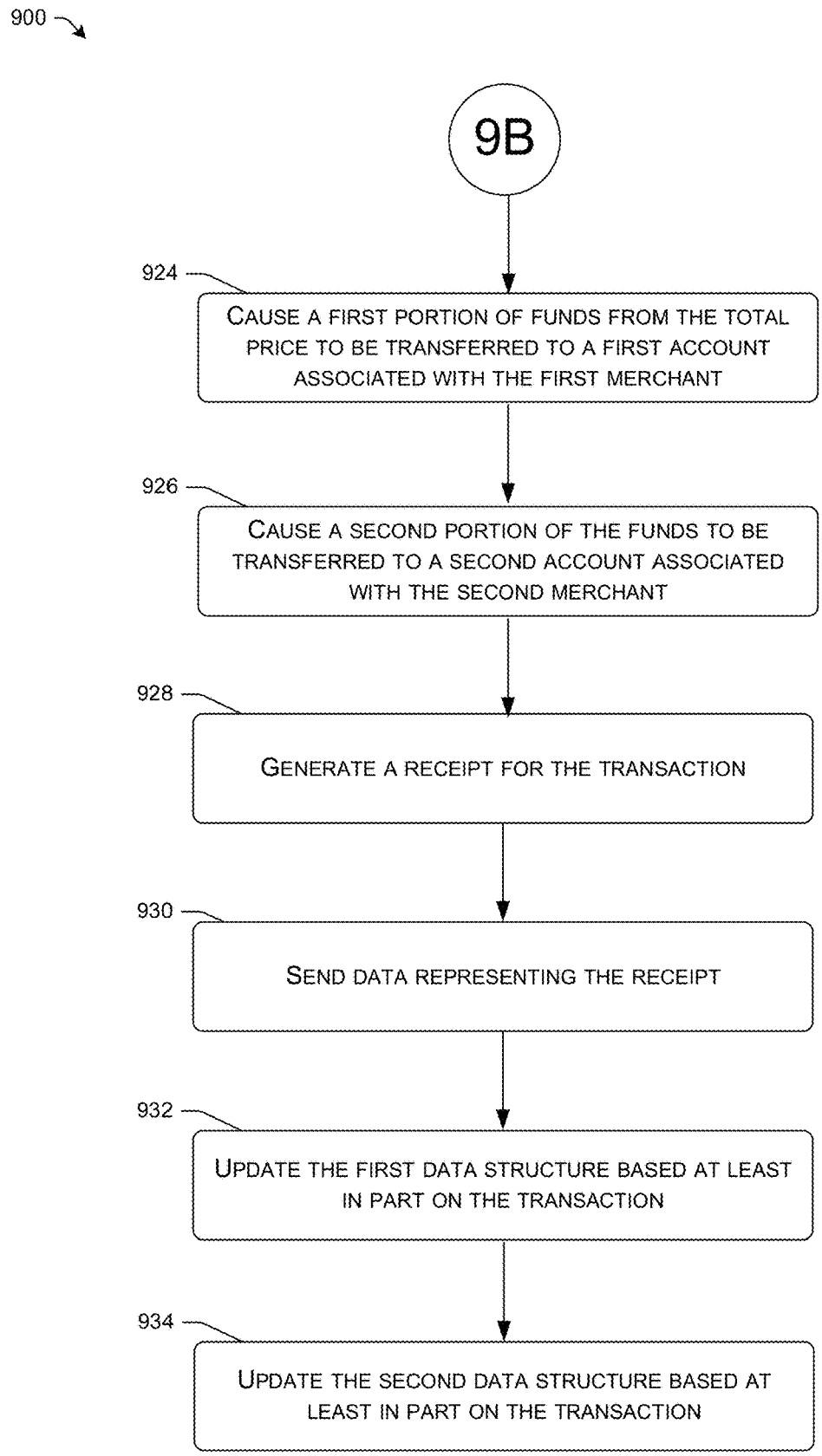

FIGS. 9A-9C illustrate a flow diagram of an example process 900 for synchronizing data between merchants' inventories, and then utilizing the data synchronization to process a cross-merchant transaction. The process 900, and other processes described herein, are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 900, and other processes described herein, may be performed by a payment service, a merchant device, a customer device, an additional electronic device, or by a combination thereof.

At 902, a payment service 108 stores a first data structure indicating a first inventory of items associated with a first merchant. In some instances, the first inventory of items can indicate at least one or more first items offered for purchase by the first merchant and a respective quantity associated with each of the one or more first items. The first merchant may provide the one or more first items for purchase to customers at a physical establishment associated with the first merchant.

In some instances, the first merchant can access the first inventory of items using a first merchant device. For instance, the first merchant device may execute an application that provides access to the first inventory of items. The first merchant may use the first merchant device to access the first inventory of items during a first session. The first session can correspond to a specific time period, such as the business hours of the first merchant. For instance, the first session can include between 8:00 a.m. and 5:00 p.m. each day.

At 904, the payment service 108 stores a second data structure indicating a second inventory of items associated with a second merchant. In some instances, the second inventory of items can indicate at least one or more second items offered for purchase by the second merchant and a respective quantity associated with each of the one or more second items. The second merchant may provide the one or more second items for purchase to customers at the physical establishment or another physical establishment associated with the second merchant.

In some instances, the second merchant can access the second inventory of items using a second merchant device. For instance, the second merchant device may execute an application that provides access to the second inventory of items. The second merchant may use the second merchant device to access the second inventory of items during a second session. The second session can correspond to a specific time period, such as the business hours of the second merchant. For instance, the second session can include between 8:00 p.m. and 5:00 p.m. each day.

At 906, the payment service 108 stores a plurality of merchant profiles associated with a plurality of merchants. For instance, the payment service 108 can generate, for each merchant, a merchant profile that indicates one or more attributes associated with the respective merchant. Attributes for a respective merchant can include a type of business associated with the respective merchant, a geographic location associated with the respective merchant, hours that the respective merchant is open (e.g., business hours), or the like.

At 908, the payment service 108 analyzes the plurality of merchant profiles to identify a similarity between a first merchant profile and a second merchant profile. For instance, the payment service 108 can compare at least the first merchant profile to the second merchant profile to identify at least one similarity between attributes of the first merchant profile and attributes of the second merchant profile. The at least one similarity can include that a first type of business associated with the first merchant is deemed similar to a second type of business associated with the second merchant (e.g., similar MCC codes), a first geographic location associated with the first merchant is within a threshold distance of the second geographic location of the second merchant (e.g., one block, one mile, etc.), and/or first business hours associated with the first merchant are the same as (e.g., both from 9:00 a.m. to 5:00 p.m.), or different than, second business hours associated with the second merchant.

At 910, the payment service 108 analyzes the first inventory of items with respect to the second inventory of items. For instance, based on identifying the similarity, the payment service 108 can analyze the first inventory of items with respect to the second inventory of items. In some instances, the analyzing can include comparing the first items offered for purchase by the first merchant to the second items offered for purchase by the second merchant. Based on the comparing, the payment service 108 can identify items offered for purchase by the second merchant, which are not offered for purchase by the first merchant.

At 912, the payment service 108 determines that the first merchant should offer a second item from the second inventory of items for purchase. For instance, the based on the analyzing, the payment service 108 can determine that the first merchant should offer the second item (and/or a subset of the second items) for purchase at the physical establishment associated with the first merchant. In some instances, the payment service 108 makes the determination based on the first inventory of items not indicating the second item. In some instances, the payment service 108 makes the determination based on determining that the first merchant includes business hours in which the second merchant is not open for operation and as such, the first merchant can provide the second item (and/or subset of the second items) for purchase during those hours.

At 914, the payment service 108 sends a message indicating that the first merchant should offer the second item for purchase. For instance, the payment service 108 can send, to a merchant device, the message indicating that the second merchant should authorize the first merchant to provide the second item (and/or a subset of the second items) for purchase. In some instances, the merchant device can be associated with the first merchant. In some instances, the merchant device can be associated with the second merchant. Still, in some instances, the merchant device can be associated with both the first merchant and the second merchant.

At 916, the payment service 108 receives a message authorizing the first merchant to offer the second item for purchase. For instance, the payment service 108 may receive, from the merchant device, a message indicating that the first merchant is authorized to provide the second item (and/or a subset of the second items) for purchase. In some instances, the message may further indicate a quantity of the second item that the first merchant is authorized to provide, a price for the second item, and a commission that is to be paid to the first merchant for providing the second item.

At 918, the payment service 108 provides access to the first inventory of items and the second item. For instance, the payment service 108 may determine that the first merchant is operating the first merchant device associated with the first merchant during the first session (e.g., during business hours). In response, the payment service 108 can provide the first merchant device access to the first inventory of items and the second item (and/or a subset of the second items). In some instances, providing access can include storing data indicating the second item in association with the first inventory of items. In some instances, providing access can include allowing the first merchant device to view the second item (and/or subset of the second items) from the second inventory of items along with the first inventory of items.

At 920, the payment service 108 receives a request to process a transaction, the request indicating at least a first item from the first inventory of items and the second item. For instance, the payment service 108 may receive, from the first merchant device associated with the first merchant, a request to process a transaction between the first merchant and a customer, where the customer is purchasing the first item and the second item from the first merchant. Additionally, in some instances, the request may include payment information associated with a payment instrument of the customer.

At 922, the payment service 108 attempts to authorize a payment instrument for a total price of the transaction. For instance, using payment information associated with the payment instrument, the payment service 108 may attempt to authorize the payment instrument for the total price of the transaction. In some instances, the payment service 108 receives the payment information in the request while in other instances, the payment service 108 stores the payment information locally.

At 924, the payment service 108 causes a first portion of funds from the total price to be transferred to a first account associated with the first merchant. For instance, the payment service 108 can determine the first portion to be distributed to the first merchant based on the price of the first item, the total price of the transaction, any commission that the first merchant receives for selling the second item, and/or the like. The payment service 108 can then cause the first portion of the funds to be transferred to the first account associated with the first merchant. In some instances, the first portion of the funds are transferred from an account associated with the customer to the account associated with the first merchant.

At 926 the payment service 108 causes a second portion of the funds from to be transferred to a second account associated with the second merchant. For instance, the payment service 108 can determine the second portion to be distributed to the second merchant based on the price of the second item, the total price of the transaction, any commission that the second merchant agreed to pay the first merchant, and/or the like. The payment service 108 can then cause the second portion of the funds to be transferred to the second account associated with the second merchant. In some instances, the second portion of the funds are transferred from the account associated with the customer to the account associated with the second merchant.

At 928, the payment service 108 generates a receipt for the transaction. For instance, the payment service 108 can generate a receipt that indicates at least that the first merchant conducted the transaction, the first item acquired by the customer, the price of the first item, the second item acquired by the customer, the price of the second item, the total price of the transaction, the date of the transaction, and/or the like. In some instances, the receipt can further indicate that the second item is associated with the second merchant.

At 930, the payment service 108 sends data representing the receipt. For instance, the payment service 108 can send the data representing the receipt to the first merchant device associated with the first merchant. In some instances, the payment service 108 can further send the data representing the receipt to an electronic device associated with the customer.

At 932, the payment service 108 updates the first data structure based at least in part on the transaction and at 934, the payment service 108 updates the second data structure based at least in part on the transaction. For instance, the payment service 108 can update the quantity for the first item as indicated by the first inventory of items. If the first inventory of items includes data indicating the second item, the payment service 108 can further update the quantity of the second item as indicated by the first inventory of items. Additionally, the payment service 108 can update the quantity for the second item as indicated by the second inventory of items.

Figure 10:
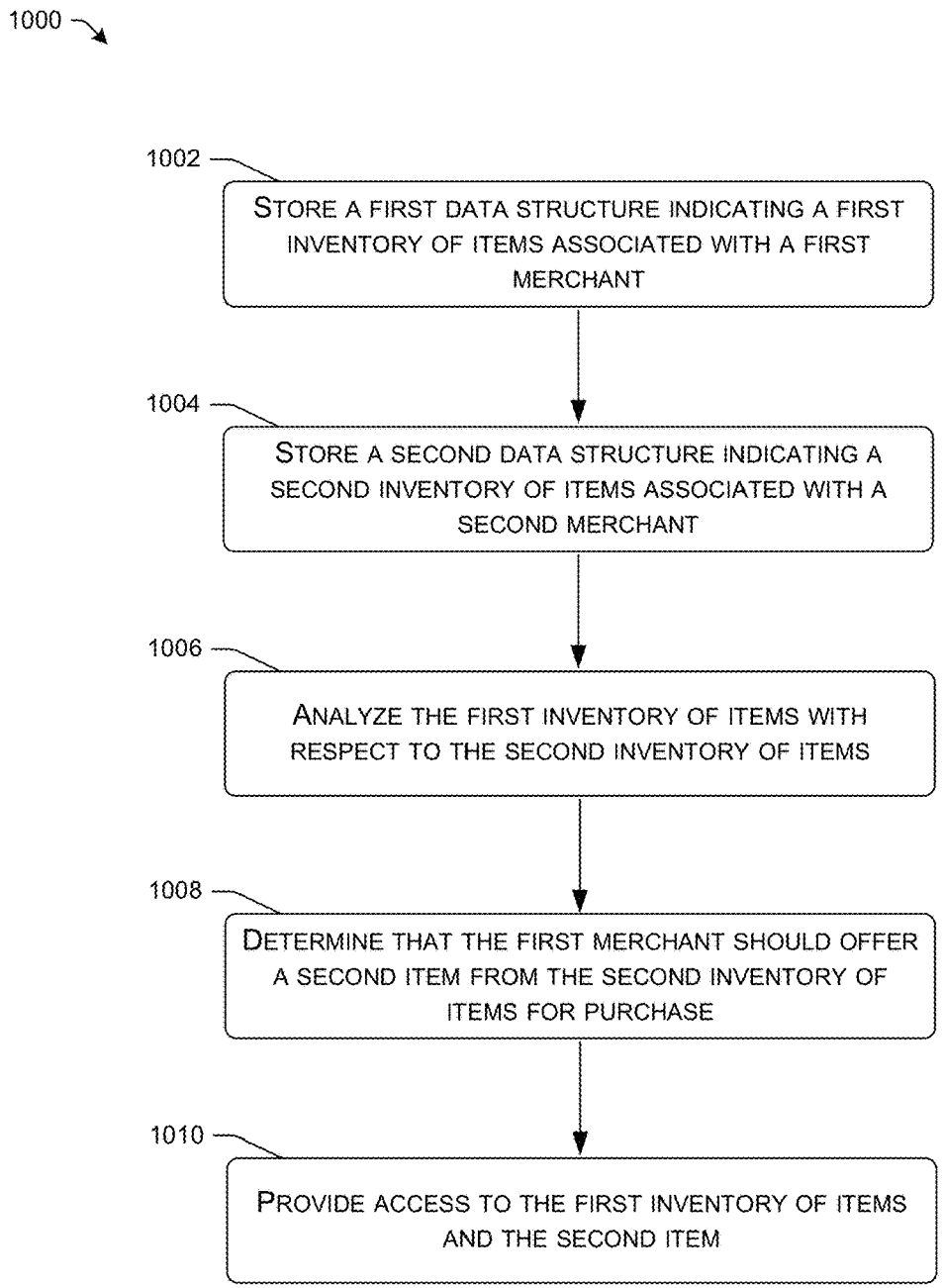
FIG. 10 illustrates a flow diagram of an example process for synchronizing data between merchants' inventories.

FIG. 10 illustrates a flow diagram of an example process 1000 for synchronizing data between merchants' inventories. At 1002, a payment service 108 stores a first data structure indicating a first inventory of items associated with a first merchant. In some instances, the first inventory of items can indicate at least one or more first items offered for purchase by the first merchant and a respective quantity associated with each of the one or more first items. The first merchant may provide the one or more first items for purchase to customers at a physical establishment associated with the first merchant.

In some instances, the first merchant can access the first inventory of items using a first merchant device. For instance, the first merchant device may execute an application that provides access to the first inventory of items. The first merchant may use the first merchant device to access the first inventory of items during a first session. The first session can correspond to a specific time period, such as the business hours of the first merchant. For instance, the first session can include between 8:00 a.m. and 5:00 p.m. each day.

At 1004, the payment service 108 stores a second data structure indicating a second inventory of items associated with a second merchant. In some instances, the second inventory of items can indicate at least one or more second items offered for purchase by the second merchant and a respective quantity associated with each of the one or more second items. The second merchant may provide the one or more second items for purchase to customers at the physical establishment or another physical establishment associated with the second merchant.

In some instances, the second merchant can access the second inventory of items using a second merchant device. For instance, the second merchant device may execute an application that provides access to the second inventory of items. The second merchant may use the second merchant device to access the second inventory of items during a second session. The second session can correspond to a specific time period, such as the business hours of the second merchant. For instance, the second session can include between 8:00 a.m. and 5:00 p.m. each day.

At 1006, the payment service 108 analyzes the first inventory of items with respect to the second inventory of items. For instance, the payment service 108 can analyze first items as indicated by the first inventory of items with respect to second items as indicated by the second inventory of items. In some instances, the analyzing can include comparing the first items offered for purchase by the first merchant to the second items offered for purchase by the second merchant. In some instances, the payment service 108 performs the analyzing based on identifying at least one similarity between the first merchant and the second merchant.

At 1008, the payment service 108 determines that the first merchant should offer a second item from the second inventory of items for purchase. For instance, the based on the analyzing, the payment service 108 can determine that the first merchant should offer the second item (and/or a subset of the second items) for purchase at the physical establishment associated with the first merchant. In some instances, the payment service 108 makes the determination based on the first inventory of items not indicating the second item. In some instances, the payment service 108 makes the determination based on determining that the first merchant includes business hours in which the second merchant is not open for operation and as such, the first merchant can provide the second item (and/or subset of the second items) for purchase during those hours.

At 1010, the payment service 108 provides access to the first inventory of items and the second item. For instance, the payment service 108 may determine that the first merchant is operating the first merchant device to conduct transactions with customers. In response, the payment service 108 can provide the first merchant device access to the first inventory of items and the second item (and/or a subset of the second items). In some instances, providing access can include storing data indicating the second item in association with the first inventory of items. In some instances, providing access can include allowing the first merchant device to view the second item (and/or subset of the second items) from the second inventory of items along with the first inventory of items.

Figure 11:
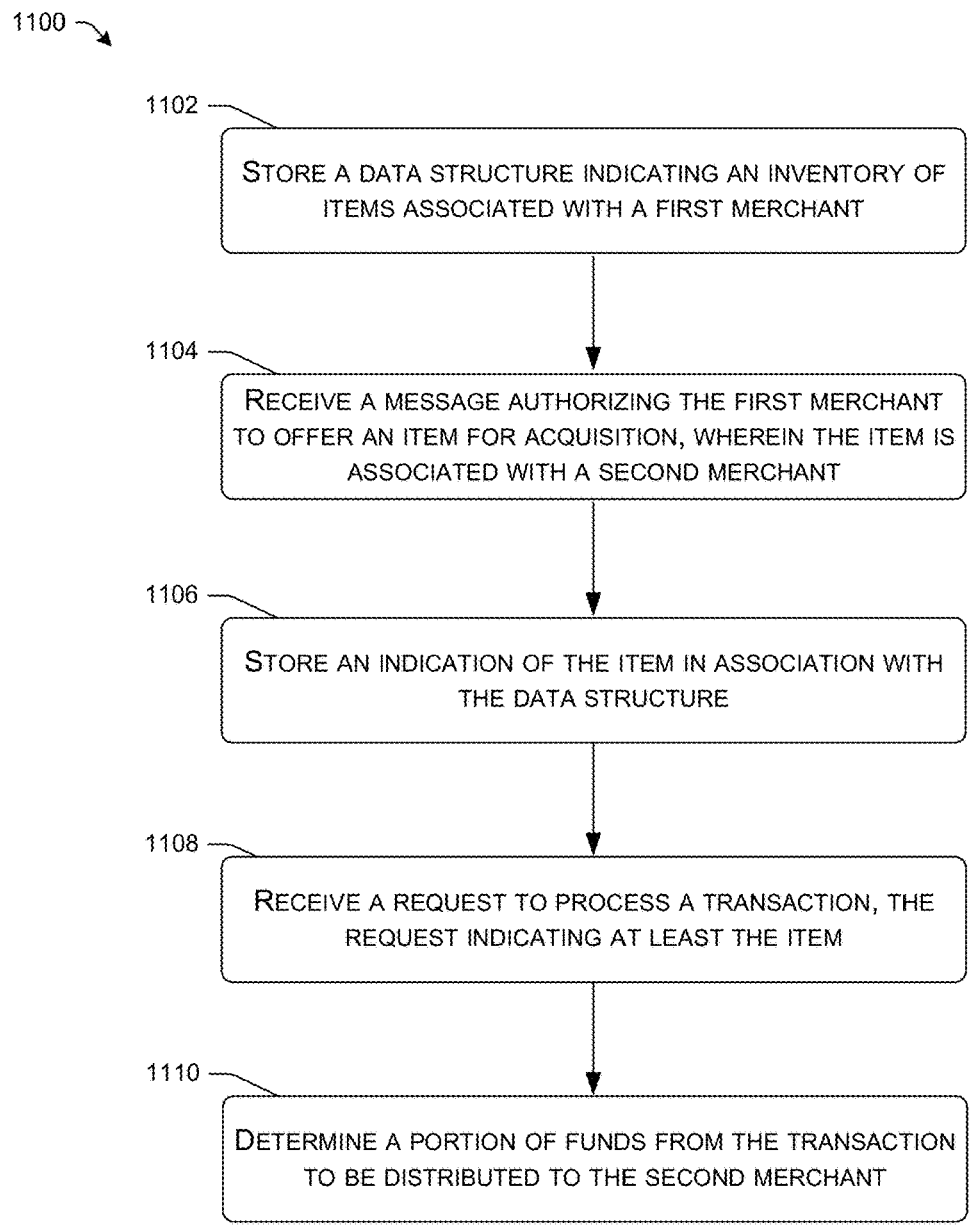
FIG. 11 illustrates a flow diagram of an example process for performing a cross-merchant transaction.

FIG. 11 illustrates a flow diagram of an example process 1100 for performing a cross-merchant transaction. At 1102, a payment service 108 stores a data structure indicating an inventory of items associated with a first merchant. In some instances, the inventory of items can indicate at least one or more items offered for acquisition by the first merchant and a respective quantity associated with each of the one or more items. The first merchant may provide the one or more items for acquisition to customers at a physical establishment associated with the first merchant.

At 1104, the payment service 108 receives a message authorizing the first merchant to offer an item for acquisition, wherein the item is associated with a second merchant. For instance, the payment service 108 may receive, from a merchant device associated with the second merchant, a message indicating that the first merchant is authorized to provide the item for acquisition at the physical establishment associated with the first merchant. In some instances, the message may further indicate a quantity of the item that the first merchant is authorized to provide, a price for the item, and/or a commission that is to be paid to the first merchant for providing the item.

At 1106, the payment service 108 stores an indication of the item in association with the data structure. For instance, the payment service 108 may update the data structure by storing, in association with the data structure, data indicating of the item. In some instances, the payment service 108 may further store, in association with the data structure, data indicating the quantity of the item and/or data indicating that the item is associated with the second merchant.

At 1108, the payment service 108 receives a request to process a transaction, the request indicating at least the item. For instance, the payment service 108 may receive, from a merchant device associated with the first merchant, a request to process a transaction between the first merchant and a customer, where the customer is acquiring the item from the first merchant. Additionally, in some instances, the request may include payment information associated with a payment instrument of the customer.

At 1110, the payment service 108 determines a portion of funds from the transaction to be distributed to the second merchant. For instance, the payment service 108 can determine the portion to be distributed to the second merchant based on the price of the item, the total price of the transaction, any commission that the second merchant agreed to pay to the first merchant, and/or the like. The payment service 108 can then cause the portion of the funds to be transferred to an account associated with the second merchant.

Figure 12:
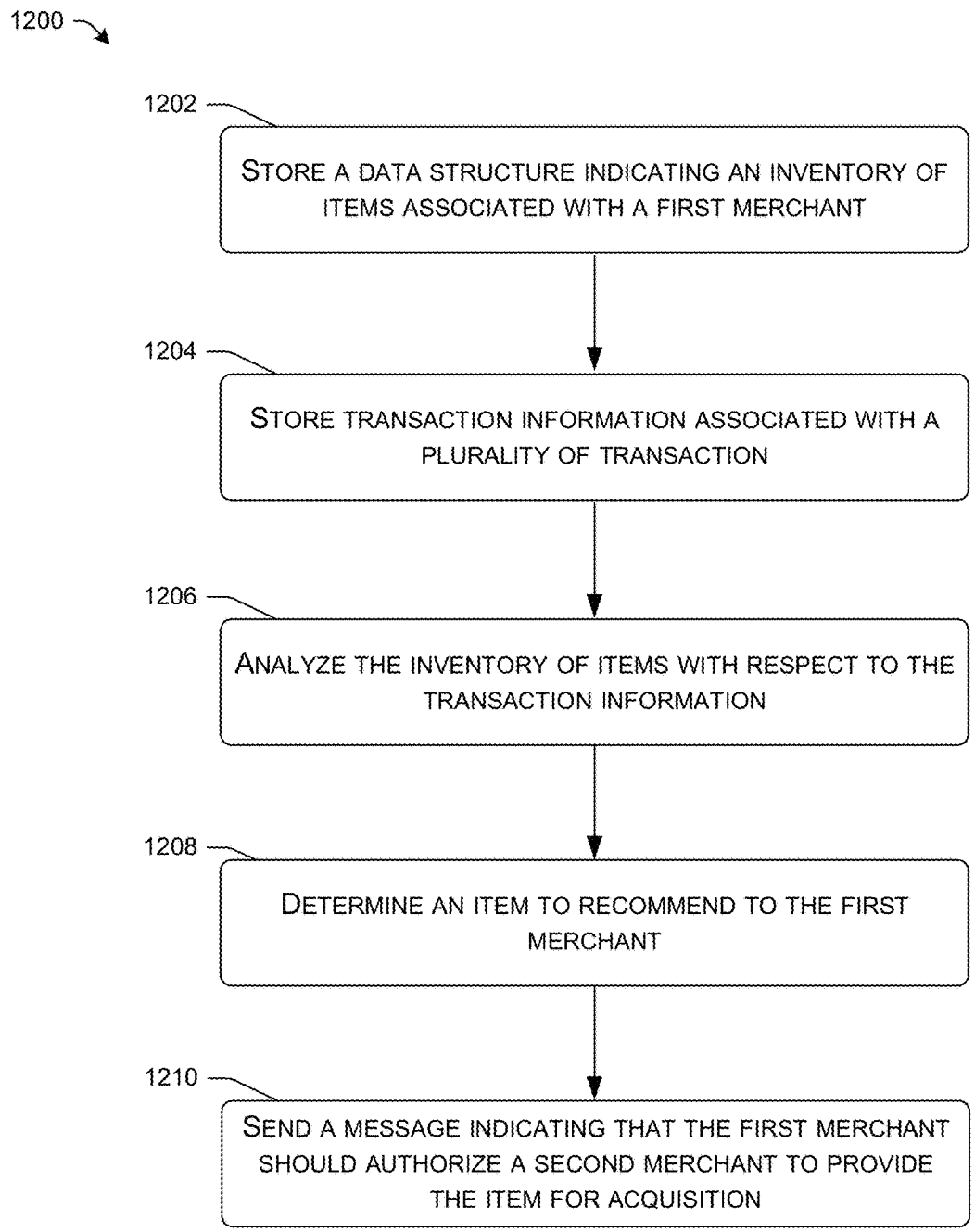
FIG. 12 illustrates a flow diagram of an example process for analyzing data in order to generate a recommendation that a first merchant authorize a second merchant to provide an item for acquisition.

FIG. 12 illustrates a flow diagram of an example process 1200 for analyzing data in order to generate a recommendation that a first merchant authorize a second merchant to provide an item for acquisition. At 1202, a payment service 108 stores a data structure indicating an inventory of items associated with a first merchant. In some instances, the inventory of items can indicate at least one or more items offered for acquisition by the first merchant and a respective quantity associated with each of the one or more items. The first merchant may provide the one or more items for acquisition to customers at a physical establishment associated with the first merchant.

At 1204, the payment service 108 stores transaction information associated with a plurality of transactions. The transaction information for a respective transaction can indicate an identifier of a merchant, an identifier (e.g., name) of a customer, payment information associated with a payment instrument used by the customer during the respective transaction, item(s)/service(s) acquired by the customer during the respective transaction, a price of the item(s)/service(s) acquired by the customer during the respective transaction, a time, place and date of the respective transaction, and so forth.

At 1206, the payment service 108 analyzes the inventory of items with respect to the transaction information and at 1208, the payment service 108 determines an item to recommend to the first merchant. For instance, the payment service 108 may compare items included in the inventory of items with items included within respective transactions of the plurality of transaction. Based on the comparing, the payment service 108 can identify that, during at least one transaction (and/or a threshold number or threshold percentage of transactions), a customer acquired an item included in the inventory of items along with an additional item not included in the inventory of items. Based on the identification, the payment service 108 can determine to recommend that the first merchant authorize a second merchant to provide the item for acquisition.

At 1210, the payment service 108 sends a message indicating that the first merchant should authorize a second merchant to provide the item for acquisition. For instance, the payment service 108 can identify the second merchant based on an inventory of items associated with the second merchant including an indication of the additional item, but not including an indication of the item provided by the first merchant. As such, the message can indicate that the first merchant authorize the second merchant to provide the item for acquisition, such as at a physical establishment associated with the second merchant.

Figure 13:
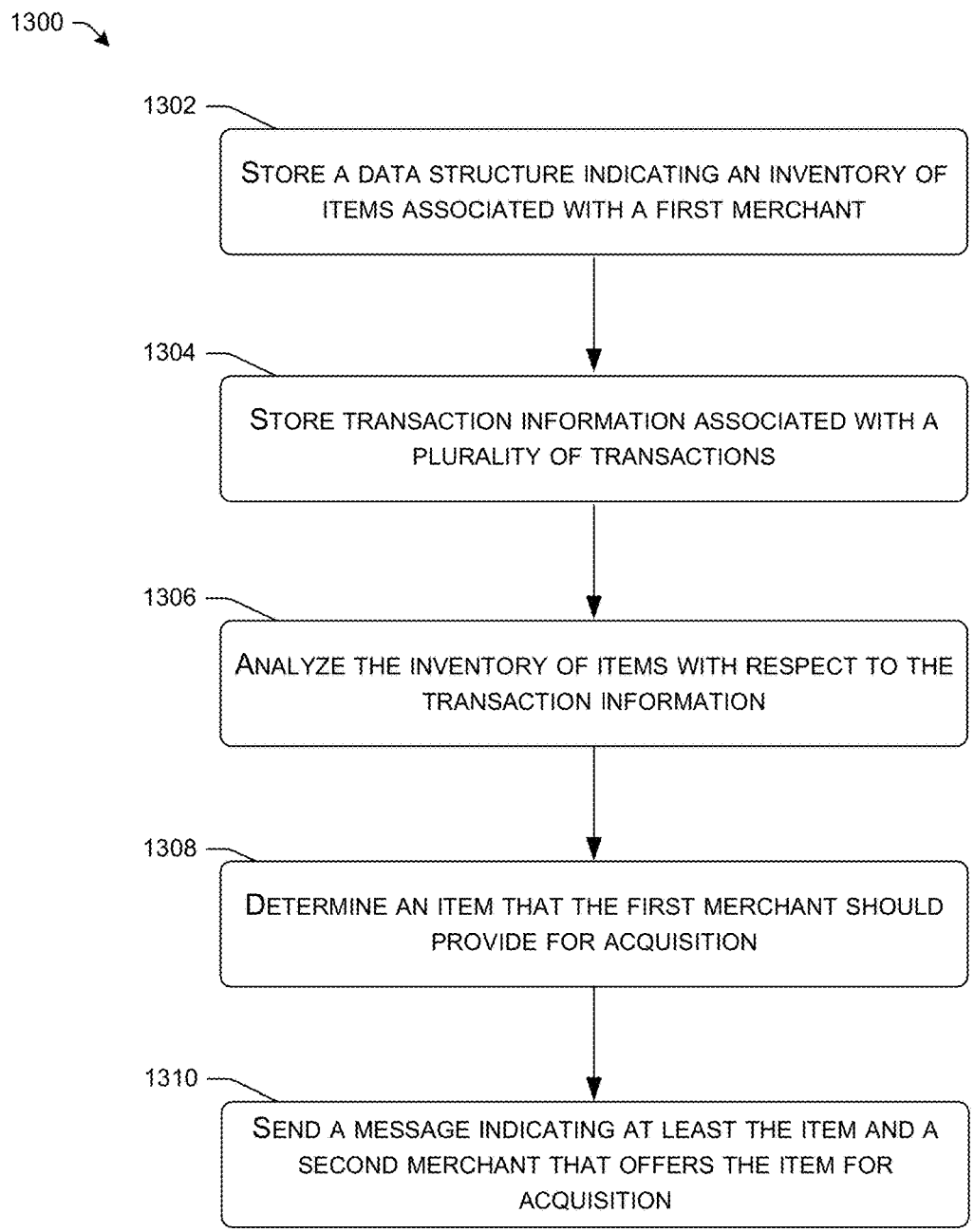
FIG. 13 illustrates a flow diagram of an example process for analyzing data in order to generate a recommendation that a merchant offer an item for acquisition.

FIG. 13 illustrates a flow diagram of an example process 1300 for analyzing data in order to generate a recommendation that a merchant offer an item for acquisition. At 1302, a payment service 108 stores a data structure indicating an inventory of items associated with a first merchant. In some instances, the inventory of items can indicate at least one or more items offered for acquisition by the first merchant and a respective quantity associated with each of the one or more items. The first merchant may provide the one or more items for acquisition to customers at a physical establishment associated with the first merchant.

At 1304, the payment service 108 stores transaction information associated with a plurality of transactions. The transaction information for a respective transaction can indicate an identifier of a merchant, an identifier (e.g., name) of a customer, payment information associated with a payment instrument used by the customer during the respective transaction, item(s)/service(s) acquired by the customer during the respective transaction, a price of the item(s)/service(s) acquired by the customer during the respective transaction, a time, place and date of the respective transaction, and so forth.

At 1306, the payment service 108 analyzes the inventory of items with respect to the transaction information and at 1308, the payment service 108 determines an item that the first merchant should provide for acquisition. For instance, the payment service 108 may compare items included in the inventory of items with items included within respective transactions of the plurality of transaction. Based on the comparing, the payment service 108 can identify that, during at least one transaction (and/or a threshold number or threshold percentage of transactions), a customer acquired an item included the inventory of items along with an additional item not included in the inventory of items. Based on the identification, the payment service 108 can determine to recommend that the first merchant provide the additional item for acquisition, such as at a physical establishment associated with the first merchant.

At 1310, the payment service 108 sends a message indicating at least the item and a second merchant that offers the item for acquisition. For instance, the payment service 108 can identify the second merchant based on an inventory of items associated with the second merchant including an indication of the additional item. As such, the message can indicate that the first merchant request, from the second merchant, authorization to provide the additional item for acquisition.

Figure 14:
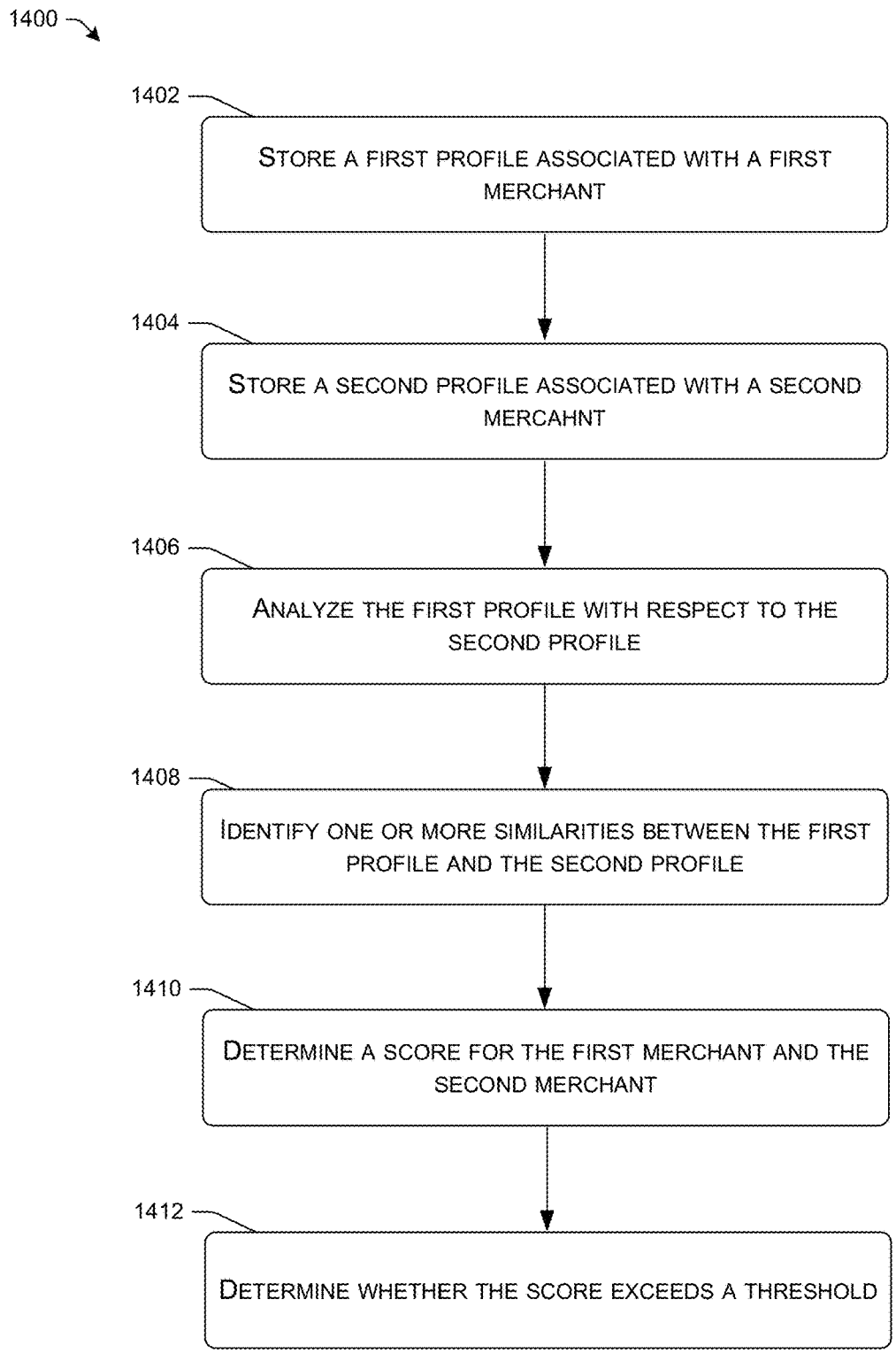
FIG. 14 illustrates a flow diagram of an example process for determining if two merchants are compatible.

FIG. 14 illustrates a flow diagram of an example process 1400 for determining if two merchants are compatible. At 1402, a payment service 108 stores a first profile associated with a first merchant. For instance, the payment service 108 may generate the first profile for the first merchant, where the first profile includes first attributes for the first merchant. The first attributes can include a type of business associated with the first merchant, a geographic location associated with the first merchant, business hours of the first merchant, and/or the like.

At 1402, a payment service 108 stores a second profile associated with a second merchant. For instance, the payment service 108 may generate the second profile for the second merchant, where the second profile includes second attributes for the second merchant. The second attributes can include a type of business associated with the second merchant, a geographic location associated with the second merchant, business hours of the second merchant, and/or the like.

At 1406, the payment service 108 analyzes the first profile with respect to the second profile and at 1408, the payment service 108 identifies one or more similarities between the first profile and the second profile. For instance, the payment service 108 can compare the first attributes included in the first profile to the second attributes included in the second profile. Based on the comparing, the payment service 108 can identify one or more similarities between the first profile and the second profile. The one or more similarities can include a similar type of business, a similar geographic location (e.g., within a threshold distance), similar business hours, or the like.

At 1410, the payment service 108 determines a score for the first merchant and the second merchant. For instance, the payment service 108 can calculate a score that is based on the one or more similarities. In some instances, the score is greater when there is a greater number of similarities, and lower when there are a fewer number of similarities. In some instances, certain attributes may be given more weight than other attributes. For instance, if two merchants are associated with a similar type of business, they may be given a greater score than two merchants that include similar business hours.

At 1412, the payment service 108 determine whether the score exceeds a threshold. For instance, the payment service 108 can determine that the first merchant and the second merchant are compatible when the score exceeds the threshold, and determine that the first merchant and the second merchant are not compatible when the score does not exceed the threshold. In some instances, when the payment service 108 determines that the first merchant and the second merchant are compatible, the payment service 108 can send one or more messages to the first merchant and the second merchant that recommend conducting cross-merchant transactions.

It should be noted that, although the processes described above discuss storing and analyzing inventories associated with merchants, similar processes can be performed by storing and analyzing catalogs associated with merchants.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
   a point-of-sale (POS) device executing an application having associated therewith a first merchant account of a first merchant and a second merchant account of a second merchant, wherein the first merchant account and the second merchant account comprise different merchant accounts that are accessible by respective merchants; and
   a payment service configured to:
      receive, from the POS device via the first merchant account, first merchant data associated with the first merchant, the first merchant data comprising at least a first period of time during which the first merchant offers first items for purchase;
      receive, from the POS device via the second merchant account, second merchant data associated with the second merchant, the second merchant data comprising at least a second period of time during which the second merchant offers second items for purchase, wherein the second period of time is different from the first period of time;
      analyze the first items with respect to the second items to determine a subset of the second items for the first merchant to provide for purchase during the first period of time; and
      provide access to the first items and the subset of the second items via the first merchant account on the POS device during the first period of time, wherein providing access to the subset of the second items enables the first merchant to offer the subset of the second items for purchase on behalf of the second merchant during the first period of time.

2. The system of claim 1, wherein the first merchant account has associated therewith a first set of services provided by the payment service, the second merchant account has associated therewith a second set of services provided by the payment service, and the payment service is further configured to perform at least one of:
   determining that the first merchant is operating the POS device at a first time associated with the first period of time; and
   enabling access to the first set of services based at least in part on a determination that the first merchant is operating the POS device at the first time; or
   based at least in part on a determination that the second merchant is operating the POS device at a second time associated with the second period of time, enabling access to the second set of services based at least in part on the determination that the second merchant is operating the POS device at the second time.

3. The system of claim 1, wherein providing access to the first items and the subset of the second items via the first merchant account on the POS device during the first period of time comprises:
  modifying a user interface associated with the first merchant account to include one or more selectable options associated with the subset of the second items; and
  causing the user interface to be presented on a display of the POS device during the first period of time.

4. The system of claim 1, wherein the subset of the second items is determined utilizing a matching algorithm.

5. The system of claim 1, wherein the payment service is further configured to:
  receive, from the POS device, a request to authorize a payment instrument for a total price of a transaction between the first merchant and a customer, the request indicating that the transaction is for a first item of the first items and a second item of the subset of the second items;
  determine a first portion of the total price associated with the first item and a second portion of the total price associated with the second item; and
  cause the first portion to be transferred to a first financial account associated with the first merchant and the second portion to be transferred to a second financial account associated with the second merchant.

6. A method comprising:
  receiving, by a computing device associated with a payment service and from a point-of-sale (POS) device associated with a first merchant and a second merchant, first merchant data associated with the first merchant, wherein the first merchant data is received via a first merchant account associated with an application executing on the POS device and comprises at least a first period of time during which the first merchant offers first items for purchase;
  receiving, by the computing device and from the POS device, second merchant data associated with the second merchant, wherein the second merchant data is received via a second merchant account associated with the application and comprises at least a second period of time during which the second merchant offers second items for purchase, wherein the second period of time is different from the first period of time;
  analyzing, by the computing device, the first items with respect to the second items to determine a subset of the second items for the first merchant to provide for purchase during the first period of time; and
  providing, by the computing device, access to the first items and the subset of the second items via the first merchant account on the POS device during the first period of time, wherein providing access to the subset of the second items enables the first merchant to offer the subset of the second items for purchase on behalf of the second merchant during the first period of time.

7. The method of claim 6, further comprising:
  determining that the first merchant account has associated therewith a first set of services provided by the payment service;
  determining that the first merchant is operating the POS device at a first time associated with the first period of time; and
  enabling access to the first set of services based at least in part on a determination that the first merchant is operating the POS device at the first time.

8. The method of claim 7, further comprising:
  determining that the second merchant is operating the POS device at a second time associated with the second period of time; and
  disabling access to the first set of services based at least in part on a determination that the second merchant is operating the POS device at the second time.

9. The method of claim 7, further comprising:
  determining that the second merchant account has associated therewith a second set of services provided by the payment service;
  determining that the second merchant is operating the POS device at a second time associated with the second period of time; and
  enabling access to the second set of services based at least in part on a determination that the second merchant is operating the POS device at the second time.

10. The method of claim 6, further comprising:
  receiving, from the POS device, a request to authorize a payment instrument for a total price of a transaction between the first merchant and a customer, the request indicating that the transaction is for a first item of the first items and a second item of the subset of the second items;
  determining a first portion of the total price associated with the first item and a second portion of the total price associated with the second item; and
  causing the first portion to be transferred to a first financial account associated with the first merchant and the second portion to be transferred to a second financial account associated with the second merchant.

11. The method of claim 10, wherein the first portion of the total price comprises at least a cost associated with the first item and a commission associated with a sale of the second item on behalf of the second merchant.

12. The method of claim 6, further comprising:
  receiving, from the POS device, a request to authorize a payment instrument for a transaction between the first merchant and a customer, the request indicating that the transaction is for a first item of the first items and a second item of the subset of the second items;
  processing the transaction between the first merchant and the customer; and
  updating a first inventory associated with the first merchant and a second inventory associated with the second merchant based at least in part on the transaction.

13. The method of claim 6, further comprising:
  sending, to the POS device during the second period of time, a first message recommending that the second merchant authorizes the first merchant to offer the subset of the second items for purchase during the first period of time; and
  receiving, from the POS device, a second message authorizing the first merchant to offer the subset of the second items for purchase during the first period of time,
  wherein providing access to the subset of the second items via the first merchant account on the POS device is based at least in part on the second message.

14. A system comprising:
  one or more processors; and
  one or more computer-readable media storing instructions that, when executed by the one or more processors, cause the one or more processors to perform operations comprising:
    receiving, from a point-of-sale (POS) device associated with a first merchant and a second merchant, first merchant data associated with the first merchant, wherein the first merchant data is received via a first merchant account associated with an application executing on the POS device and comprises at least a first period of time during which the first merchant offers first items for purchase;

receiving, from the POS device, second merchant data associated with the second merchant, wherein the second merchant data is received via a second merchant account associated with the application and comprises at least a second period of time during which the second merchant offers second items for purchase, wherein the second period of time is different from the first period of time;

analyzing the first items with respect to the second items to determine a subset of the second items for the first merchant to provide for purchase during the first period of time; and providing access to the first items and the subset of the second items via the first merchant account on the POS device during the first period of time, wherein providing access to the subset of the second items enables the first merchant to offer the subset of the second items for purchase on behalf of the second merchant during the first period of time.

15. The system of claim 14, wherein the first merchant account has associated therewith a first set of services provided by a payment service and the second merchant account has associated therewith a second set of services provided by the payment service, the operations further comprising at least one of:

based on a determination that the first merchant is operating the POS device at a first time associated with the first period of time, enabling access to the first set of services based at least in part on the determination that the first merchant is operating the POS device at the first time; or based on a determination that the second merchant is operating the POS device at a second time associated with the second period of time, enabling access to the second set of services based at least in part on the determination that the second merchant is operating the POS device at the second time.

16. The system of claim 15, the operations further comprising at least one of:

disabling the first set of services during the second period of time; or disabling the second set of services during the first period of time.

17. The system of claim 14, wherein providing access to the first items and the subset of the second items via the first merchant account on the POS device during the first period of time comprises:

modifying a user interface associated with the first merchant account to include one or more selectable options associated with the subset of the second items; and causing the user interface to be presented on a display of the POS device during the first period of time.

18. The system of claim 14, wherein the subset of the second items is determined utilizing a matching algorithm.

19. The system of claim 14, the operations further comprising:

receiving, from the POS device, a request to authorize a payment instrument for a total price of a transaction between the first merchant and a customer, the request indicating that the transaction is for a first item of the first items and a second item of the subset of the second items;

determining a first portion of the total price associated with the first item and a second portion of the total price associated with the second item; and causing the first portion to be transferred to a first financial account associated with the first merchant and the second portion to be transferred to a second financial account associated with the second merchant.

20. The system of claim 19, wherein the first portion of the total price comprises at least a cost associated with the first item and a commission associated with a sale of the second item on behalf of the second merchant.

* * * * *